(12) United States Patent
Mimura et al.

(10) Patent No.: US 10,436,603 B2
(45) Date of Patent: Oct. 8, 2019

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Yoshitaka Mimura, Wako (JP); Kohei Okimoto, Wako (JP); Naotaka Kumakiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 14 days.

(21) Appl. No.: 15/581,577

(22) Filed: Apr. 28, 2017

(65) Prior Publication Data

US 2017/0314957 A1 Nov. 2, 2017

(30) Foreign Application Priority Data

Apr. 28, 2016 (JP) .................................. 2016-090690

(51) Int. Cl.
G01C 21/36 (2006.01)
G05D 1/02 (2006.01)
G01C 21/34 (2006.01)

(52) U.S. Cl.
CPC ..... G01C 21/3697 (2013.01); G01C 21/3407 (2013.01); G01C 21/3667 (2013.01);
(Continued)

(58) Field of Classification Search
CPC ............ G01C 21/3697; G01C 21/3667; G05D 1/021; G05D 2201/0213
See application file for complete search history.

(56) References Cited

U.S. PATENT DOCUMENTS

2003/0060973 A1* 3/2003 Mathews ............... G01C 21/26
701/410
2017/0206721 A1* 7/2017 Koo ................... G07C 9/00015
(Continued)

FOREIGN PATENT DOCUMENTS

JP 2015-141477 A 8/2015
JP 2015-141478 A 8/2015

OTHER PUBLICATIONS

Office Action dated Nov. 21, 2017, issued in counterpart Japanese Application No. 2016-090690, with English translation (5 pages).

*Primary Examiner* — Rodney A Butler
(74) *Attorney, Agent, or Firm* — Westerman, Hattori, Daniels & Adrian, LLP

(57) ABSTRACT

A vehicle control system includes: an automated drive control unit that performs automated driving where at least one of speed control and steering control of a vehicle is performed automatically; a route guidance unit that decides a traveling route over which the vehicle will travel to a destination that has been set, and performs guidance to the decided traveling route; and a presentation unit that presents, to the passenger, at least one of an automated drive proportion that indicates the proportion of the traveling route to the destination where the automated driving can be performed, distance over which automated driving can be performed, predicted driving time over which automated driving can be performed, timing for performing the automated driving, and number of times of performing the automated driving.

6 Claims, 14 Drawing Sheets

(52) U.S. Cl.
CPC ......... *G01C 21/3676* (2013.01); *G05D 1/021* (2013.01); *G05D 1/0214* (2013.01); *G05D 2201/0213* (2013.01)

(56) References Cited

U.S. PATENT DOCUMENTS

| | | | | |
|---|---|---|---|---|
| 2017/0370740 A1* | 12/2017 | Nagy | ................. | G01C 21/3484 |
| 2018/0058879 A1* | 3/2018 | Tayama | ................. | B60K 35/00 |
| 2018/0141547 A1* | 5/2018 | Fujiki | ................... | B60W 30/10 |

\* cited by examiner

188

| | DRIVING MODE | MANUAL DRIVING MODE | AUTOMATED DRIVE MODE | | | ... |
| NON-DRIVING MODE | | | MODE A | MODE B | MODE C | |
|---|---|---|---|---|---|---|
| NAVIGATION OPERATIONS | | NO | OK | OK | NO | ... |
| CONTENT PLAYING OPERATIONS | | NO | OK | NO | NO | ... |
| INSTRUMENT PANEL OPERATIONS | | NO | OK | OK | OK | ... |
| ... | | ... | ... | ... | ... | ... |

VEHICLE CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-030690, filed Apr. 28, 2016, entitled "Vehicle Control System, Vehicle Control Method, And Vehicle Control Program." The contents of this application are incorporated herein by reference in their entirety.

BACKGROUND

1. Field

The present disclosure, relates to a vehicle control system, a vehicle control method, and a vehicle control program.

2. Description of the Related Art

As of recent, research is being advanced regarding technology where at least one of speed control and steering control of a vehicle is automatically performed (hereinafter, "automated drive"), In relation with this, there has been disclosed an automated drive support system that has a route acquisition unit that acquires a traveling plan route for a vehicle including an automated drive section where automated drive control of the vehicle is performed, an interruption section setting unit that sets an interruption section where automated drive control is not performed, in the automated drive section included in the traveling plan route, in accordance with user operations, and a control content setting unit that sets control contents of the automated drive that is performed with regard to the vehicle, for sections in automated drive section included in the traveling plan route excluding the interruption section (see Japanese Unexamined Patent Application Publication No. 2015-141478, for example).

However, the passenger must set interruption sections for automated driving to match his/her intent in the conventional art, rather than the passenger selecting one traveling route from multiple traveling routes. It has been found desirable to provide a vehicle control system, a vehicle control method, and a vehicle control program, where a route closer to the intent of the passenger can be easily selected from multiple routes including automated drive sections.

SUMMARY

The present application describes a vehicle control system including: an automated drive control unit (an automated drive controller) that performs automated driving where at least one of speed control and steering control, of a vehicle is performed automatically; a route, guidance unit (a route guidance device) that decides a traveling route over which the vehicle will travel to; a destination that has been set, and per forms guidance to the decided traveling route; and a presentation unit (a presentation device) that presents, to the passenger of the vehicle, at least one of an automated drive proportion that indicates the proportion of the traveling route to the destination where the automated driving can be performed, distance over which automated driving can be performed, predicted driving time over which automated driving can be performed, timing for performing the automated, driving, and number of times of performing the automated driving. The word "unit" used in this application may mean a physical part or component of computer hardware or any device including a controller, a processor, a memory, etc., which is particularly configured to perform functions and steps disclosed in the application.

The route guidance unit may calculate the automated drive proportion based on the distance of the traveling route to the destination, and the distance over which automated driving can be performed as to the traveling route.

The route guidance unit may calculate the automated drive proportion based on the predicted driving time to the destination, and the predicted driving time over which automated driving can be performed as to the traveling route to the destination.

Accordingly, a route closer to the intent of the passenger can be easily selected from multiple routes including automated drive sections.

The vehicle control system may further include one or more display units that display images, the route guidance unit displaying the traveling route to the destination and the automated drive sections on the traveling route, on the display units.

Accordingly, the vehicle passenger can be notified of the traveling schedule of the own vehicle, the timing of the automated drive mode, and so forth, in a readily understand manner.

The vehicle control system may further include an operation accepting unit. The route guidance unit may display on the display units at least one of candidates for traveling routes to the destination, the automated drive proportion for each traveling route candidate, distance over which automated driving can be performed, predicted driving time over which automated driving can be performed, timing for performing the automated driving, and number of times of performing the automated driving, and the operation accepting unit may accept selection operations of one of the traveling route candidates displayed on the display units.

Accordingly, a route closer to the intent of the passenger can be easily selected from multiple routes including automated drive sections.

The vehicle control system may further include an acquisition unit that acquires a state of the traveling route. In a case that guidance of the vehicle is performed as to the decided traveling route, the route guidance unit may reset at least one of candidates for traveling routes from the current location of the vehicle to the destination, the automated drive proportion for each traveling route candidate, distance over which automated driving can be performed, predicted driving time over which automated driving can be performed, timing for performing the automated driving, and number of times of performing the automated driving, based on change in the state acquired by the acquisition unit relating to the decided traveling route, and display the reset information on the display unit.

Accordingly, the vehicle passenger can select an appropriate traveling route in accordance with change in the state of the traveling route.

A vehicle control method executed by an onboard computer includes: performing automated driving where at least one of speed control and steering control of a vehicle is performed automatically; deciding a traveling route over which the vehicle will travel to a destination that has been set, and performing guidance to the decided traveling route; and presenting, to the passenger by a presentation unit, at least one of an automated drive proportion that indicates the proportion of the traveling route to the destination where the automated driving can be performed, distance over which automated driving can be performed, predicted driving time over which automated driving can be performed, timing for performing the automated driving, and number of times of performing the automated driving.

A vehicle control program causes an onboard computer to execute performing automated driving where at least one of speed control and steering control of a vehicle is performed automatically, deciding a traveling route over which the vehicle will travel to a destination that has been set, and performing guidance to the decided traveling route, and presenting, to the passenger by a presentation unit, at least one of an automated drive proportion that indicates the proportion of the traveling route to the destination where the automated driving can be performed, distance over which automated driving can be performed, predicted driving time over which automated driving can be performed, timing for performing the automated driving, and number of times of performing the automated driving. It is understood and well known in the art that such program may be provided in a form of a computer program product having instructions stored in a computer readable media and readable and executable by a computer such, as a vehicle control device to execute the instructions.

Accordingly, a route closer to the intent of the passenger can easily be selected from multiple routes including automated drive sections.

DESCRIPTION OF THE PREFERRED EMBODIMENTS

Figure 1:
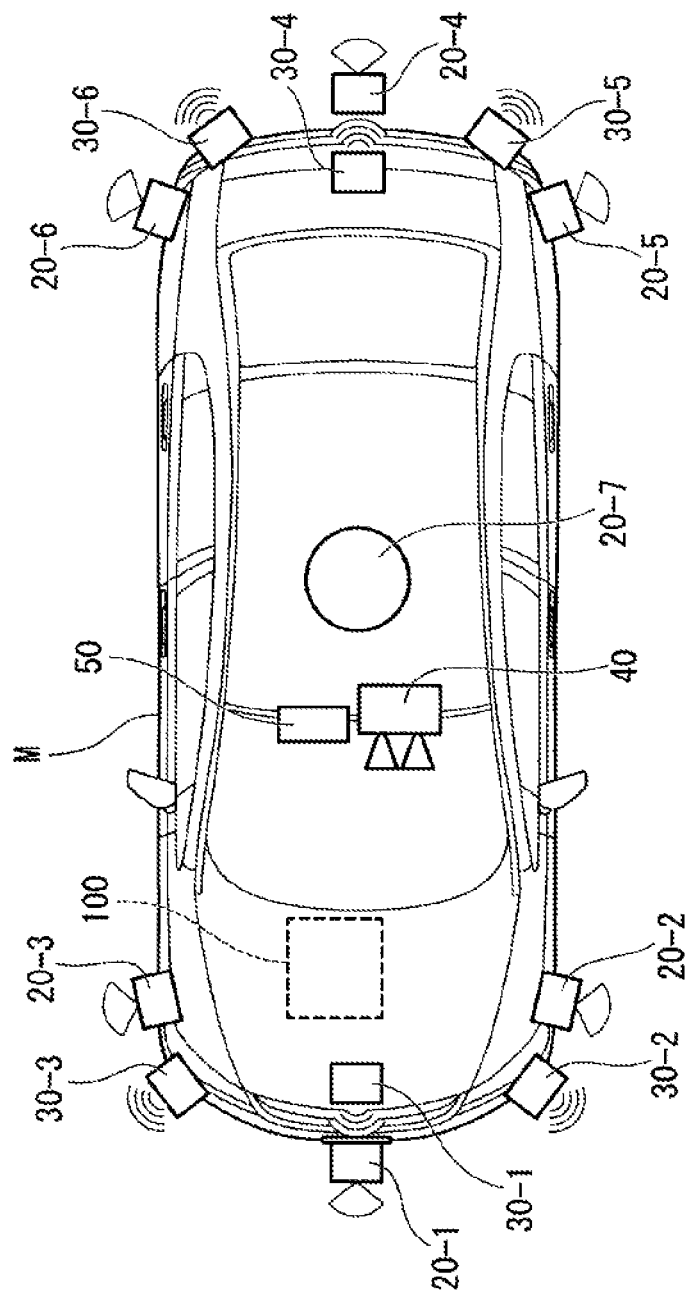
FIG. 1 is a diagram illustrating components of a vehicle in which a vehicle control system according to an embodiment is installed.

An embodiment of a vehicle control system, a vehicle control method, and a vehicle control program, according to the present disclosure, will be described with reference to the drawings. FIG. 1 is a diagram illustrating components of a vehicle in which a vehicle control system 100 according to the embodiment is installed (hereinafter referred to as "own vehicle M"). Examples of a vehicle in which the vehicle control system 100 is installed include automobiles using internal combustion engines such as diesel engines, gasoline engines, and so forth, as the power source, electric automobiles using electric motors as the power source, hybrid automobiles having both internal combustion engines and electric motors, and so forth, and the number of wheels may be two, three, four, or the like. Electric automobiles are driven using electric power discharged from batteries, examples of which include secondary batteries, hydrogen fuel cells, metal fuel cells, alcohol fuel cells, and so forth.

The own vehicle M is provided with sensors such as finders 20-1 through 20-7, radars 30-1 through 30-6, a camera (imaging unit) 40, and so forth, a navigation device (an example of a route guidance unit, presentation unit, display unit, operation accepting unit) 50, and the vehicle control, system 100, as illustrated in FIG. 1.

The finders 20-1 through 20-7 are, for example sensors using LIDAR (short for either Light Detection and Ranging and Laser Imaging Detection and Ranging) that measures scattered light from emitted light, to measure distance to an object. As one example, the finder 20-1 is attached to the front grill or the like, and the finders 20-2 and 20-3 are attached to the sides or door mirrors of the vehicle, inside the headlights, near the turn indicators, or the like. The finder 20-4 is attached on the trunk lid or the like, and the finders 20-5 and 20-6 are attached at the sides of the vehicles, within the taillights, or the like. The finders 20-1 through 20-6 described above have a detection range of around 150 degrees with regard to the horizontal direction, for example. The finder 20-7 is attached to the roof or the like. The finder 20-7 has a detection range of 360 degrees with regard to the horizontal direction, for example.

The radars 30-1 and 30-4 are long-range millimeter wave radars, that have a broader detection range than the other radars regarding the depth direction, for example. The other radars 30-2, 30-3, 30-5, and 30-6 are mid-range millimeter wave radars, that have a narrower detection range than the other radars regarding the depth direction, for example.

Note that hereinafter, in a case where the finders 20-1 through 20-7 are not distinguished in particular, this will be written simply as "finder 20". In a case where the radars 30-1 through 30-6 are not distinguished in particular, this will be written simply as "radar 30". The radar 30 detects objects using frequency-modulated continuous wave (FMCW) technology, for example.

The camera 40 is a digital camera using a solid state imaging device such as a charge-coupled device (CCD) or complementary metal oxide semiconductor (CMOS) device or the like, for example. The camera 40 is attached to the upper part of the front windshield, on the rear side of the room mirror, or the like. The camera 40 periodically and repeatedly shoots in front of the own vehicle M, for example. The camera 40 may be a stereo camera including multiple cameras.

It should be noted that the configuration illustrated in FIG. 1 is only exemplary. Part of the configuration may be omitted, and further, other configurations may be added thereto.

Figure 2:
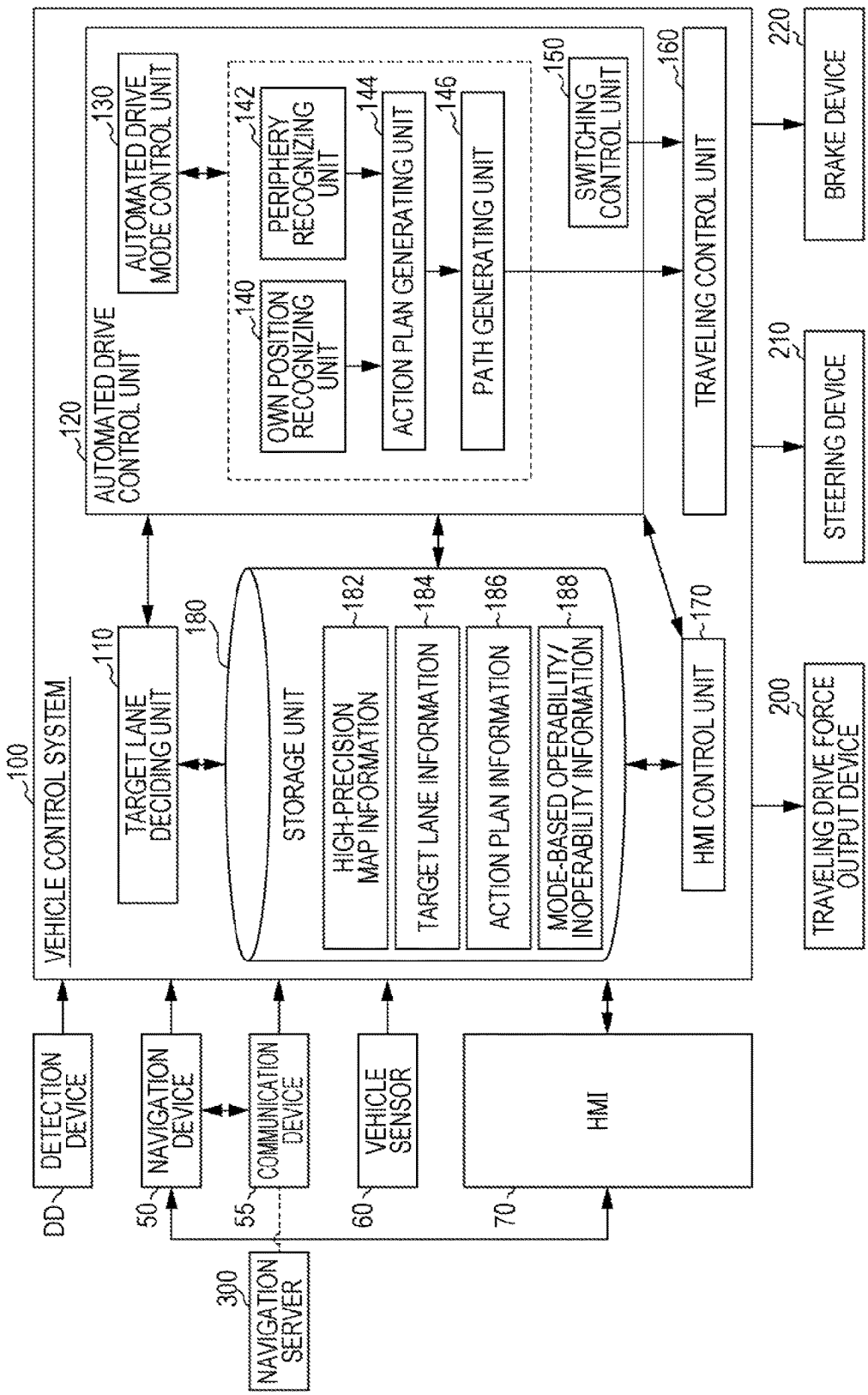
FIG. 2 is a functional configuration diagram centered on the vehicle control system.

FIG. 2 is a functional configuration diagram centered on the vehicle control system 100 according to the embodiment. The own vehicle M includes detection devices DD including the finder 20, radar 30, camera 40, and so forth, the navigation device 50, a communication device (acquisition unit) 55, a vehicle sensor 60, a human-machine interface (HMI) 70, the vehicle control system 100, a traveling drive force output device 200, a steering device 210, and a brake device 220. These devices and equipment are connected to each other by multiplexed communication lines or serial communication lines such as such as controller area network (CAN) communication lines, wireless communication networks, or the like. Note that the concept of "vehicle control system" as used in the Present Specification is not restricted to the vehicle control system 100 alone, and may include configurations other than the vehicle control system 100 (e.g., at least one of the detection devices DD, navigation device 50, communication device 55, vehicle sensor 60, HMI 70, and so forth).

The navigation device 50 has a global navigation satellite system (GNSS) receiver, a storage unit storing map information (navigation map) and so forth, a touch-panel display device functioning as a user interface, a speaker, a microphone, and so forth. The navigation device 50 identifies the position of the own vehicle M using the GNSS receiver, and acquires a route to the destination specified by a vehicle passenger (passenger) or the like of the own vehicle M from that position. The configuration for identifying the position of the own vehicle M may be provided independently from the navigation device 50. For example, the position of the own vehicle 14 may be identified, or compensated by an inertial navigation system (INS) using output of the vehicle sensor 60, for example.

The navigation device 50 displays a screen (interface screen) for a vehicle passenger of the own vehicle M to set a destination, for example, and receives instructions from the vehicle passenger. The navigation device 50 transmits destination information accepted from the screen and information indicating the current position of the own vehicle M to a navigation server (external device) 300 via the communication device 55, and places a query for a traveling route.

The navigation server 300 acquires information relating to one or multiple traveling route candidates, based on the position information of the vehicle (the above-described own vehicle M) and destination information that have been saved, map information (navigation map) for route navigation that is stored beforehand and newest traffic information (congestion information) and so forth. The navigation server 300 also transmits the acquired information to the vehicle (the above-described own vehicle M) which has placed the query.

The navigation device 50 acquires information relating to traveling route candidates to the destination, that has been transmitted from the navigation server 300, via the communication device 55. Note that an arrangement may be made where the navigation device 50 does not acquire information relating to traveling route candidates to the destination from the navigation server 300, but rather acquires information relating to traveling route candidates using the navigation map stored in the navigation device 50.

The navigation device 50 outputs acquired information relating to traveling route candidates to a later-described target lane deciding unit 110 (calculating unit). The target lane deciding unit 110 references high-precision map information 182 regarding the candidate traveling routes input from the navigation device 50, and generates candidates of sections where automated driving can be performed in each traveling route.

The navigation device 50 presents one or both of information relating to traveling route candidates, and sections where automated driving can be performed in each traveling route candidate calculated by the target lane deciding unit 110 and the proportion where automated driving can be performed (automated drive proportion), to the vehicle passenger. Note that information relating to automated driving that is presented to the vehicle passenger is not restricted to the automated drive proportion, and may be any one of the above-described automated drive proportion, distance over which automated driving can be performed, predicted driving time over which automated, driving can be performed, timing for performing the automated driving (e.g., the timing at which automated, driving is to be performed the first time, or the last time), and number of times of performing the automated driving, for example. The following description will be made regarding an example of using automated drive proportion out to the above-described various types of information.

The navigation device 50 in this case may display, instead of or in addition to an interface screen displaying the traveling route, a screen displaying automated drive sections or automated drive proportion, a selection screen for accepting selection operations regarding which traveling route to travel out of the candidate traveling routes, and so forth, or may perform audio output of information relating to the automated drive proportion.

The navigation device 50 accepts the traveling route set by the vehicle passenger via the displayed screen, and outputs the accepted results to the vehicle control system 100. Thus, the vehicle control system 100 performs automated drive control and so forth of the own vehicle M over the section that the vehicle passenger has selected, based on the settings information accepted by the navigation device 50.

Once the route to the destination has been decided, the navigation device 50 performs navigation to the destination, by guidance through audio, screen display, and so forth, regarding the traveling route to the destination. While performing navigation of the own vehicle M over the traveling route that has been decided, the navigation device 50 rests the traveling route candidates from the current position of the own vehicle M to the destination and the automated drive proportion for the traveling route candidates using the target lane deciding unit 110 or the like, based on traveling route conditions obtained from the navigation server 300 (e.g., weather conditions and information of accidents). Other information to be reset may be at least one of distance over which automated driving can be performed, predicted driving time over which automated driving can be performed, timing for performing the automated driving, and number of times of performing the automated driving, for example. The navigation device 50 also displays the information that has been set again (traveling route candidates and automated drive proportion) on the screen.

Note that the functions of the navigation device 50 described above can also be realized at a presentation unit (e.g., display device 82) or the like of the HMI 70. For example, the navigation device 50 may collaborate with the presentation unit of the HMI 70 or the like to display the content displayed by the navigation device 50 on the display device 82, or to display only on the display unit of the HMI 70. The navigation device 50 may acquire information, input from, the HMI 70 and perform processing accordingly.

The navigation device 50 may be realized by functions of a terminal device, such as a smartphone or tablet terminal or the like that a vehicle passenger of the own vehicle M or the like has, for example. In this case, information is exchanged between the terminal device and the vehicle control system 100 by wireless or cabled communication.

The communication device 55 performs wireless communication using, for example, cellular network, Wi-Fi network, Bluetooth (a registered trademark), dedicated short-range communication (DSRC), or the like. The communication device 55 exchanges data with the above-described navigation server 300, vehicles in the periphery of the own vehicle M, and so forth, for example, by wireless communication. For example, the communication device 55 may transmit route search query signals for the destination to the navigation server 300, and receive route search results as to the query, traveling route condition information, and so forth, from the navigation server 300.

The vehicle sensor 60 includes a vehicle speed sensor that detects vehicle speed, an acceleration sensor that detects acceleration, a yaw rate sensor that detects the angular speed on a vertical axis, a directional sensor that detects the orientation of the own vehicle M, and so forth.

Figure 3:
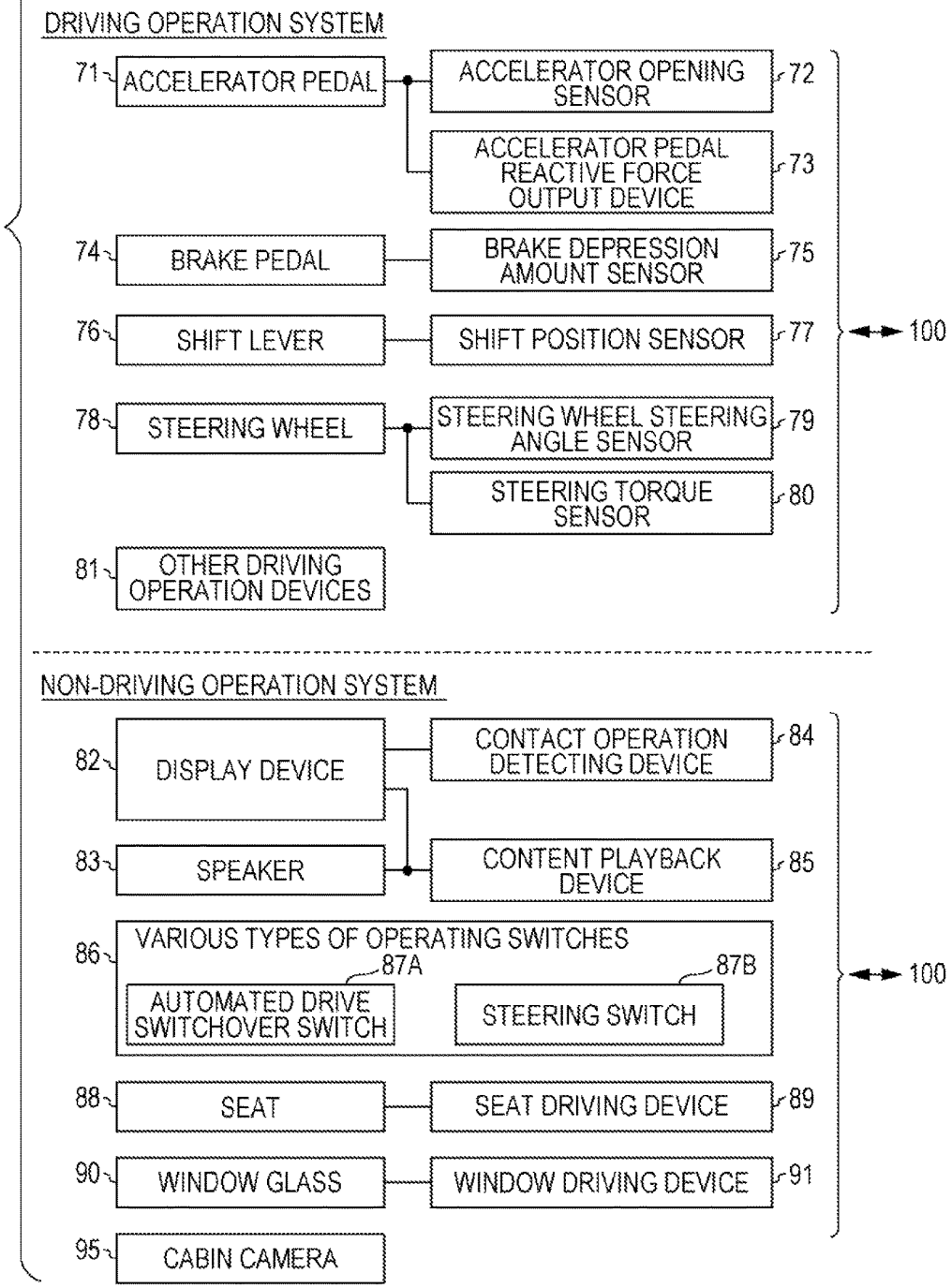
FIG. 3 is a configuration diagram of a human-machine interface.

FIG. 3 is a configuration diagram of the HMI 70. The HMI 70 includes a driving operation system configuration and a non-driving operation system configuration, for example. There is no clear-cut boundary between these two, and an arrangement may be made where the configuration of the driving operation system contains the functions of the non-driving operation system, or vice versa. Part of the HMI 70 is an example of an "operation accepting unit" that accepts instructions and selections from the vehicle passenger of the own vehicle, serving as a "presentation unit" presenting information to the vehicle passenger, and a "display unit" displaying images.

The HMI 70 includes, for example, an accelerator-pedal 71, a throttle opening sensor 72, an accelerator pedal reactive force output device 73, a brake pedal 74, a brake depression amount sensor (alternatively, a master pressure sensor or the like) 75, a shift lever 76, a shift position sensor 77, a steering wheel 78, a steering wheel steering angle sensor 79, a steering torque sensor 80, and other driving operation devices 81, as the driving operation system configuration.

The accelerator pedal 71 is an operandum for accepting acceleration instructions (or deceleration instructions by a returning operation) by the vehicle passenger. The accelerator opening sensor 72 detects the amount of depression of the accelerator pedal 71, and outputs accelerator opening signals indicating the depression amount to the vehicle control system 100. Note that instead of outputting to the vehicle control system 100, output may be directly made to the traveling drive force output device 200, steering device 210, or brake device 220. This holds true regarding the other components of the driving operations system described below. The accelerator pedal reactive force output device 73 outputs force opposite to the direction in which the accelerator pedal 71 is operated (reactive force to operation) in accordance with instructions from the vehicle control system 100, for example.

The brake pedal 74 is an operandum to accept deceleration instructions from the vehicle passenger. The brake depression amount sensor 75 detects the depression amount (or depression force) of the brake pedal 74, and outputs brake signals indicating the detection results to the vehicle control system 100.

The shift lever 76 is an operandum for accepting gearshift change instructions by the vehicle passenger. The shift position sensor 77 detects the gearshift position instructed by the vehicle passenger, and outputs shift position signals indicating the detection results to the vehicle control system 100.

The steering wheel 78 is an operandum that accepts turning instructions from the vehicle passenger. The steering angle sensor 79 detects the operation angle of the steering wheel 78, and outputs steering angle signals indicating the detection results to the vehicle control system 100. The steering torque sensor 80 detects the torque applied to the steering wheel 78, and outputs steering torque signals indicating the detection results to the vehicle control system 100.

The other driving operation devices 81 are, for example, joysticks, buttons, dial switches, graphical user interface (GUI) switches, and so forth. The other driving operation devices 81 accept acceleration instructions, deceleration instructions, turning instructions, and so forth, and output to the vehicle control system 100.

The HMI 70 includes, for example, the display device 82, a speaker 83, a contact operation detecting device 84, a content playback device 85, various types of operating switches 86, a seat 88, a seat driving device 89, a window glass 90, a window driving device 91, and a cabin camera (imaging unit) 95, as the configuration of the non-driving operation system.

The display device 82 is a display device such as a liquid crystal display (LCD) or organic electroluminescence (EL) display or the like, installed at any portion of the instrument panel, or facing the passenger seat or rear seats. The display device 82 may also be a head-up display (HUD) where images are projected on a window, such as a front window seal or the like. Note that the display device 82, the navigation device 50, terminal devices which the vehicle passengers of the own vehicle M have (e.g., smartphones and tablet terminals), and so forth, are examples of a "display unit" that displays various types of information such as images and so forth.

The speaker 83 outputs sound. The contact operation detecting device 84 detects a contact position (touch position) on the display screen of the display device 82 in a case where the display device 82 is a touch panel, and outputs to the vehicle control system 100. If the display device 82 is not a touch panel, the contact operation detecting device 84 may be omitted.

The display device 82 can output information such as images and the like output from the above-described navigation device 50, and can output information from the vehicle passenger that the contact operation detecting device 84 has accepted, to the navigation device 50. Note that the display device 82 may have functions the same as the functions of the above-described navigation device 50, for example. The navigation device 50 may be included in the HMI 70.

Examples of the content playback device 85 include a digital versatile disc (DVD) players, compact disc (CD) players, television receivers, generating devices of various types of guidance navigation images, and so forth. Part or all of the display device 82, speaker 83, contact operation detecting device 84, and content playback device 85 may be common configurations with the navigation device 50.

The various types of operating switches 86 are disposed at optional positions within the cabin. The various types of operating switches 86 include an automated drive switchover switch 87A that instructs starting (or future starting) and stopping of automated driving, and a steering switch 87B that switches display contents at the display units (e.g., the navigation device 50, display device 82, and content playback device 85) and the like. The automated drive switchover switch 87A and steering switch 87B may be either of graphical user interface (GUI) switches and mechanical switches. The various types of operating switches 86 may also included switches for driving the seat driving device 89 and window driving device 91. Upon receiving operations from a vehicle passenger, the various types of operating switches 86 output operations signals to the vehicle control system 100.

The seat 88 is a seat where the vehicle passenger is seated. The seat driving device 89 drives the reclining angle, fore-aft position, yaw angle, etc., of the seat 88. The window glass 90 is provided to each door, for example. The window driving device 91 drives the window glass 90 open/closed.

The cabin camera 95 is a digital camera using a solid state imaging device such as a CCD or CMOS or the like. The cabin camera 95 is attached to a position capable of imaging at least the heads of the vehicle passenger performing driving operations, such as to the rearview mirror, steering boss, instrumental panel, or the like. The cabin camera 95 periodically and repeatedly shoots the vehicle passenger, for example. The cabin camera 95 may analyze imaged images based on facial feature information and the like, and acquire the position of the face of the vehicle passenger, the line of view, the state of posture, and so forth, for example.

The traveling drive force output device 200, steering device 210, and brake device 220 will be described before describing the vehicle control system 100.

The traveling drive force output device 200 outputs traveling drive force (torque) for the vehicle to travel, to the drive wheels. In a case where the own vehicle M is an automobile having an internal combustion engine as the power source for example, the traveling drive force output device 200 has an engine, a transmission, and an engine electronic control unit (ECU) for controlling the engine. In a case where the own vehicle M is an electric automobile having an electric motor as the power source, the traveling drive force output device 200 has a traveling electric motor and a motor ECU for controlling the traveling electric motor. In a case where the own vehicle M is a hybrid automobile, the traveling drive force output device 200 has an engine, transmission, engine ECU, traveling electric motor, and motor ECU. If the traveling drive force output device 200 includes only an engine, the engine ECU adjusts the throttle opening of the engine, gearshift, and so forth, following information input from a later-described traveling control unit 160. If the traveling drive force output device 200 includes only a traveling electric motor, the motor ECU adjusts the duty ratio of pulse-width modulation (PWM) signals provided to the traveling motor, following information input from the traveling control unit 160. If the traveling drive force output device 200 includes an engine and a traveling electric motor, engine ECU and motor ECU collaboratively control traveling drive force following information input from the traveling control unit 160.

The steering device 210 has a steering ECU and an electric motor, for example. The electric motor changes the steering direction by acting upon a rack-and-pinion mechanism, for example. The steering ECU drives the electric motor to change the steering direction, in accordance with information input from the vehicle control system 100, or information of the steering angle or steering torque that is input.

The brake device 220 is an electric servo brake device that has brake calipers, a cylinder that transmits hydraulic pressure to the brake calipers, an electric motor that generates hydraulic pressure at the cylinder, and a braking control unit, for example. The braking control unit of the electric servo brake device controls the electric motor in accordance with information input from the traveling control unit 160, so that brake torque corresponding to the control operations are output to the wheels. The electric servo brake device may have a backup mechanism where hydraulic pressure generated by brake pedal operations is transmitted to the cylinder via a master cylinder. Note that the brake device 220 is not restricted to being the above-described electric servo brake device, and may be an electronically controlled hydraulic brake device instead. An electronically controlled, hydraulic, brake device controls an actuator in accordance, with Information, input from, the traveling control unit 100, to transmit hydraulic pressure of a master cylinder to the cylinder. The brake device 220 may also include regenerative brakes using a traveling electric motor included in the traveling drive force output device 200.

Vehicle Control System

Description will be made regarding the vehicle control system 100. The vehicle control system 100 is realized by one or more processors, or hardware having functions equivalent thereto, for example. The vehicle control system 100 may be a configuration where a processor such as a central processing unit (CPU), a storage device, and a communication interface are connected to an ECU by an internal bus, or a micro-processing unit (MPU) or the like, are combined.

Returning to FIG. 2, the vehicle control system 100 has, for example, the target lane deciding unit 110, an automated drive control unit 120, the traveling control unit 160, and a storage unit 180. The automated drive control unit 120 has, for example, an automated drive mode control unit 130, an own position recognizing unit 140, a periphery recognizing unit 142, an action plan generating unit 144, a path generating unit 146, and a switching control unit 150.

Part or all of the target lane deciding unit 110, automated drive control unit 120, traveling control unit 160, and HMI control unit 170 is realized by a processor, executing a program (software). Part or all of these may be realized by hardware such as large scale integration (LSI) or application specific integrated circuit (ASIC) or the like, or may be realized by a combination of software and hardware.

The storage unit 180 stores, for example, high-precision map information 182, target lane information 184, action plan information 186, mode-based operability/inoperability information 188, and so forth. The storage unit 180 is realized by read-only memory (ROM), random access memory (RAM), a hard disk drive (HDD), flash memory, or the like. The program executed by the processor may be stored in the storage unit 180 beforehand, or may be downloaded from an external device via onboard Internet facilities, or the like. The program may be installed in the storage unit 180 by a transportable storage medium sorting the program being mounted to a drive device that is omitted from illustration. The computer of the vehicle control system 100 (onboard computer) may be decentralized among multiple computer devices.

The target lane deciding unit 110 is realized by an MPU, for example. The target lane deciding unit 110 divides a route provided from the navigation device 50 into multiple blocks (e.g., divides into 100 m increments with regard to the direction of travel of the vehicle), and references the high-precision map information 182 to decide the target lane for each block.

The target lane deciding unit 110 also determines whether or not automated driving can be performed, for each of the above blocks, for example, along the route provided from the navigation device 50. For example, the target lane deciding unit 110 determines which of automated drive mode and manual driving mode to set for each block. The target lane deciding unit 110 then decides, for sections where the own vehicle M can be driven in automated drive mode (automated drive sections) under control of the automated drive control unit 120, how many lanes from the left, for example, to drive in. Sections where traveling in automated drive mode can be performed can be set based on locations of freeway entrances/exits (ramps, interchanges, etc.), toll booths, etc., the shape of the road (straight for a predetermined distance or longer), and so forth, for example. Sections where driving can be performed in automated drive mode are, for example, sections of freeway driving and the like, but this is not restrictive, and may be sections on ordinary roads where the traffic is light, there are not many intersections, and so forth, for example.

The target lane deciding unit 110 also acquires traveling distance and predicted driving time or the like as a rough indication, regarding the route provided from the navigation device 50. The traveling distance can foe acquired based on distance information of the roads included in the high-precision map information 182. The predicted traveling distance can also be acquired based on the legal speed limit for traveling each road, included in the high-precision map information 182. Such information may be acquired from the navigation server 300.

The target lane deciding unit 110 also calculates the automated drive proportion for the route traveled by the own vehicle M, for example. The automated drive proportion is, for example, how much of the entire route that automated driving can be performed. For example, target lane deciding unit 110 can calculate the automated drive proportion as to the traveling route by dividing the distance of the traveling route to the destination by the distance over which automated driving can be performed on the traveling route. The target lane deciding unit 110 can also calculate the automated drive proportion by dividing the predicted driving time to the destination by the predicted driving time by automated driving on the traveling route. The target lane deciding unit 110 may also calculate at least one of distance over which automated driving can be performed on the traveling route, predicted, driving time over which automated driving can be performed, timing for performing the automated driving, and number of times of performing the automated driving. Note that the above-described processing may be performed by the target lane deciding unit 110, or may be performed by the navigation device 50.

In a case where there are places to branch and to merge along the traveling route, the target lane deciding unit 110 decides a target lane, so that the own vehicle M is traveling in a lane which is sensible to be in to advance to the branch, for example. The target lane decided by the target lane deciding unit 110 is stored in the storage unit 180 as target lane information 184.

The high-precision map information 182 is map information that is more highly precise than the navigation map that the navigation device 50 or navigation server 300 has. The high-precision map information 182 includes information relating to the middle of lanes, information of boundaries of lanes, and so forth, for example. The high-precision map information 182 may also include road information, traffic restriction information, address information (addresses and postal codes), facility information, telephone number information, and so forth. Road information may include information indicating the type of road, such, as freeway, toll road, federal highway, state highway, and so forth, and other information such as the number of lanes of the road, the width of each lane, the grade of the road, the location of the road (3D coordinates including latitude, longitude, and elevation), curvature of curves for each lane, location of merging and branching points for each lane, traffic signs along the road, and so forth. The traffic restriction information may include information such as a lane being closed due to construction work, traffic accident, congestion, etc.

When acquiring information indicating traveling route candidates by the above-described navigation device 50, the target lane deciding unit 110 references the high-precision map information 182 or the like and acquires information of sections to be travelled in automated drive mode from, the automated drive control unit 120, and outputs the acquired information to the navigation device 50. In a case of having finalized the traveling route to the destination and the automated drive sections by the navigation device 50, the target lane deciding unit 110 generates target lane information 184 corresponding to the traveling route and automated drive sections, and stores in the storage unit 130.

The automated drive control unit 120 performs automated driving where at least one of speed control and steering control of the own vehicle M is automatically performed, for example. Speed control is control of acceleration including one or both of acceleration and deceleration, having an amount of change in speed exceeding a threshold value over a unit of time, for example. Speed control may also include steady traveling control where traveling is performed within a certain speed range. The automated drive control unit 120 may also perform display control to display the selected traveling route and sections to perform automated driving on a display unit such as that of the navigation device 50 or the like.

The automated drive mode control unit 130 decides the mode for automated driving that the automated drive control unit 120 will carry out. The following modes are included in the automated drive modes according to the present embodiment. Note that the following is only an example, and the number of automated drive modes may foe optionally decided.

Mode A

Mode A is a mode where the degree of automated driving is the highest. In a case where mode A is implemented, all vehicle control, such as complex merging control and the like, is performed automatically, so the vehicle passenger does not have to monitor the periphery or the state of the own vehicle M.

Mode B

Mode B is a mode where the degree of automated driving is next higher after mode A. In a case where mode B is implemented, basically all vehicle control is automatically performed, but in some cases, driving operations of the own vehicle M are relegated to the vehicle passenger. Thus, the vehicle passenger must monitor the periphery and the state of the own vehicle M.

Mode C

Mode C is a mode where the degree of automated driving is next higher after mode B. In a case where mode C is implemented, the vehicle passenger must perform confirmation operations as to the HMI 70 in some cases. For example, in mode C, in a case where the vehicle passenger is notified of the timing of changing lanes, and the vehicle passenger performs operations to instruct the HMI 70 to change lanes, automatic lane changing is performed. Thus, the vehicle passenger must monitor the periphery and the state of the own vehicle M.

The automated drive mode control unit 130 decides the automated drive mode based on operations of the vehicle passenger as to the HMI 70, events decided by the action plan generating unit 144, driving form decided by the path generating unit 146, and so forth. The automated drive mode is notified to a HMI control unit 170. Limits may also be set to the automated drive modes, based on the capabilities of the detection devices DD of the own vehicle M and so forth. For example, in a case where the capabilities of the detection devices DD are low, an arrangement may be made, where mode A is not implemented. Any of the modes can be switched to manual driving mode by operations performed at the driving operation system configuration of the HMI 70 (overriding).

The own position recognizing unit 140 recognizes the lane where the own vehicle M is traveling (traveling lane) and the relative position of the own vehicle M as to the traveling lane, based on the high-precision map information 182 stored in the storage unit 180, and information input from the finder 20, radar 30, camera 40, navigation device 50, and/or vehicle sensor 60. The own position recognizing unit 140 recognizes the traveling lane by comparing patterns in road lanes (i.e., a layout of solid lines and broken lines) recognized from the high-precision map information 182 with patterns in road lanes in the periphery of the own vehicle M, recognized from images imaged by the camera 40, for example. The position of the own vehicle M acquired from the navigation device 50 and processing results by an INS may be included in this recognition.

Figure 4:
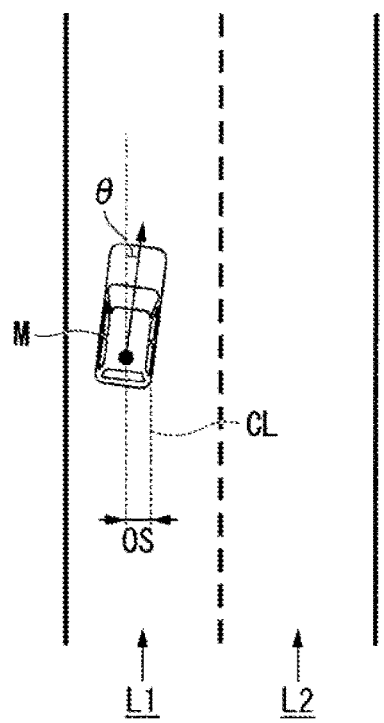
FIG. 4 is a diagram illustrating the way in which an own position recognizing unit recognizes the relative position of a traveling lane L1 as to an own vehicle.

FIG. 4 is a diagram illustrating illustrates the way in which the own position recognizing unit 140 recognizes the relative position of the own vehicle K as to the traveling lane L1. The own position recognizing unit 140 recognizes a deviation OS of a reference point of the own vehicle M (e.g., center of gravity) from the traveling lane center CL, and an angle θ as to a line formed by extending the traveling lane center CL in the direction of travel of the own vehicle M, as the relative position of the own vehicle M as to the traveling lane L1, for example. Alternatively, the own position recognizing unit 140 may recognize the position of the reference point of the own vehicle M as to either edge of the own traveling lane L1, or the like, as the relative position of the own vehicle M as to the traveling lane. The relative position of the own vehicle M recognized by the own position recognizing unit 140 is provided to the target lane deciding unit 110.

The periphery recognizing unit 142 recognizes the state of vehicles in the periphery, such as the position, speed, acceleration, or the like thereof, based on information input from the finder 20, radar 30, camera 40, and so forth. Vehicles in the periphery are vehicles traveling in the periphery of the own vehicle M, in the same direction as the own vehicle M, for example. The positions of the vehicles in the periphery may be expressed by representative points of these other vehicles, such as the center of gravity, corners, or the like, or may be represented as regions expressed in the form of outlines of the other vehicles. The "state" of the vehicles in the periphery may include acceleration of the vehicles in the periphery, and whether or not the vehicles in the periphery are changing lanes (or whether or not attempting to change lanes), that is comprehended based on information from the above-described various types of equipment. In addition to vehicles in the periphery, the periphery recognizing unit 142 may also recognize the position of guardrails, utility poles, parked vehicles, pedestrians, fallen objects, railroad crossings, traffic lights, signs erected at construction sites, and other objects.

The action plan generating unit 144 sets a start-point for automated driving and/or a destination for automated driving. The start point for automated driving may be the current position of the own vehicle M, or may be a point where an operation is made instructing automated driving. The action plan generating unit 144 generates an action plan for the section between the start point and the destination of automated driving. However, this is not restrictive, and the action plan generating unit 144 may generate an action plan for any section.

An action plan is made up of multiple events which are executed in sequence, for example. Examples of events include a deceleration event where the own vehicle M is decelerated, an acceleration event where the own vehicle M is accelerated, a lane-keeping event where the own vehicle H is caused to travel without veering from the traveling lane, a lane-changing event where the traveling lane is changed, an overtaking event where the own vehicle M is caused to overtake a vehicle ahead, a branching event where, at a branch point, the own vehicle M is caused to change lanes to a desired lane or to travel without veering from the current traveling lane, a merging event where, at a merging lane that merges with the main road, the own vehicle M is caused to decelerate and change lanes, a handover event where transition is made from manual driving mode to automated drive mode at an automated drive start point, for transitioning from automated drive mode to manual driving mode at an automated drive end point, and so forth.

For locations where the target lane decided by the target lane deciding unit 110 changes, the action plan generating unit 144 sets a lane-changing event, a branching event, or a merging event. Information indicating the action plan generated by the action plan generating unit 144 is stored in the storage unit 180 as action plan information 186.

Figure 5:
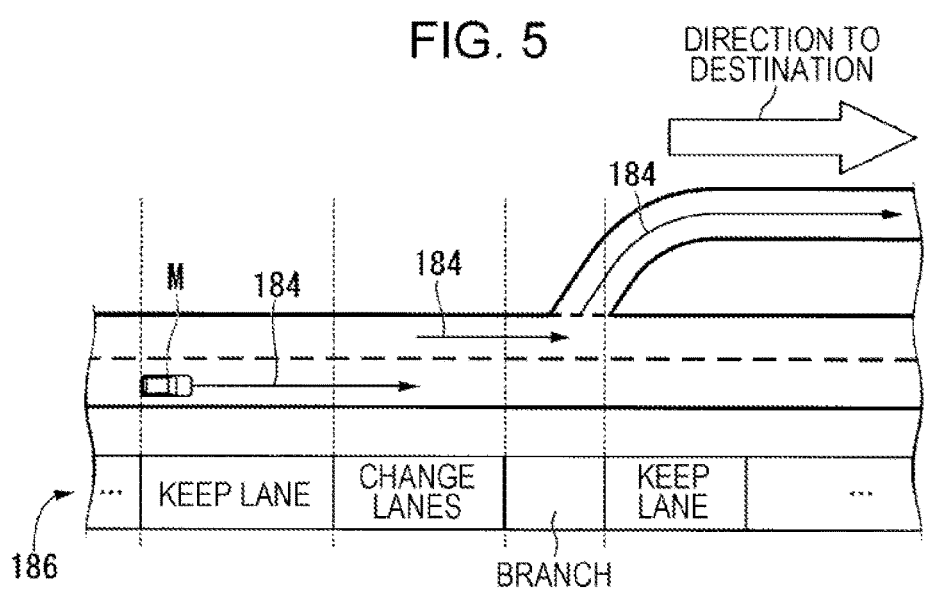
FIG. 5 is a diagram illustrating an example of an action plan generated regarding a certain section.

FIG. 5 is a diagram illustrating an example of an action plan generated regarding a certain section. The action plan generating unit 144 generates an action plan necessary for the own vehicle M to travel along the target lane indicated toy the target lane information 184, as Illustrated in FIG. 5. Note that the action plan generating unit 144 may dynamically change the action plan in accordance with change in the state of the own vehicle M, regardless of the target lane information 184. For example, in a case where the speed of a vehicle in the periphery that has been recognized by the periphery recognizing unit 142 while traveling along the lane exceeds a threshold value, or the direction of movement of a vehicle in the periphery traveling in a lane adjacent to the own lane is headed toward the own lane, the action plan generating unit 144 may change the event set for the driving section where the own vehicle M is planned to travel. In a case where an event has been set to execute a lane-changing event after a lane keeping even, for example, but the recognition results of the periphery recognizing unit 142 find that a vehicle is approaching at a speed exceeding a threshold value from behind in the lane to which lane changing was planned during this lane-keeping event, the action plan generating unit 144 may change the event following the lane-keeping event from the lane-changing event to a deceleration event, lane-keeping event, etc. Consequently, even in a case where change occurs in the state in the periphery, the vehicle control, system 100 can perform safe automated driving of the own vehicle M.

Figure 6:
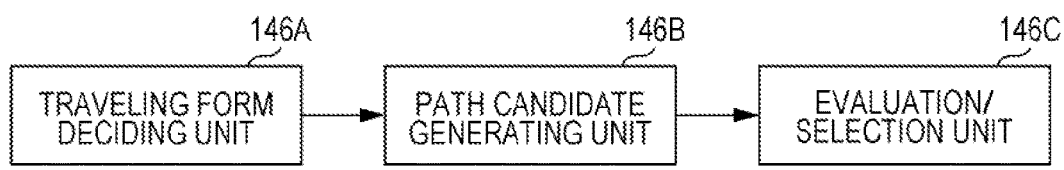
FIG. 6 is a diagram illustrating an example of the configuration of a path generating unit.

FIG. 6 is a diagram illustrating an example of the configuration of the path generating unit 146. The path generating unit 146 has a traveling form deciding unit 146A, a path candidate generating unit 146B, and an evaluation/selection unit 146C, for example. The traveling form deciding unit 146A, for example, decides which traveling form of constant-speed traveling, following traveling, low-speed following traveling, deceleration traveling, curve traveling, obstacle avoidance traveling, and so forth, to perform when carrying out a lane-keeping event. For example, if there are no other vehicles ahead of the own vehicle M, the traveling form deciding unit 146A decides the traveling form to be constant-speed traveling. If the own vehicle M is following another vehicle traveling ahead, the traveling form deciding unit 146A decides the traveling form to be following traveling. If the own vehicle M is caught in a traffic jam or the like, the traveling form deciding unit 146A decides the traveling form to be low-speed following traveling. If the periphery recognizing unit 142 has recognized that a vehicle traveling ahead has decelerated, or in a case where an event such as stopping or parking or the like is to be executed, the traveling form deciding unit 146A decides the traveling form to be deceleration traveling. In a case where the periphery recognizing unit 142 has recognized that the own vehicle M is approaching a carve, the traveling form deciding unit 146A decides the traveling form to be curve traveling. In a case where the periphery recognizing unit 142 has recognized that there is an obstacle ahead, the traveling form deciding unit 146A decides the traveling form to be obstacle avoidance traveling.

Figure 7:
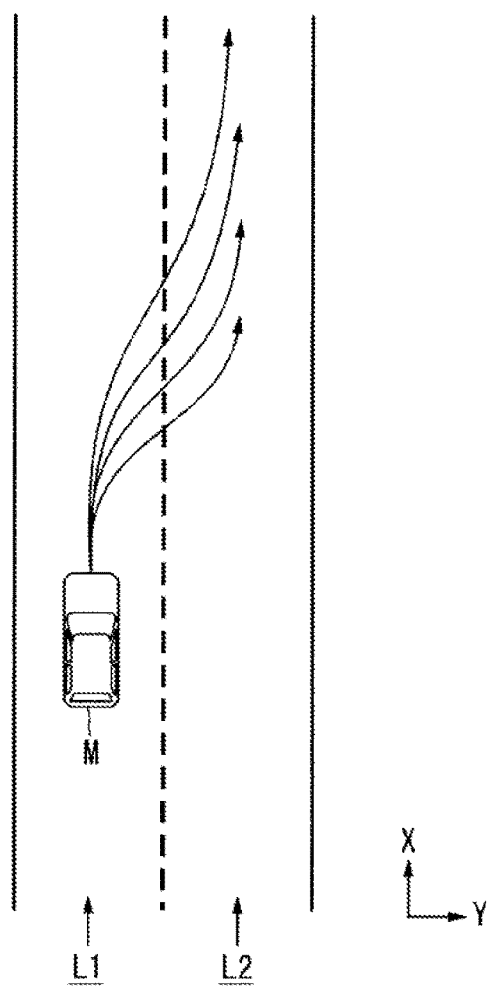
FIG. 7 is a diagram illustrating an example of candidate paths generated by a path candidate generating unit.

The path candidate generating unit 146B generates path candidates based on the traveling form decided by the traveling form deciding unit 146A. FIG. 7 is a diagram illustrating an example of candidates for paths generated by the path candidate generating unit 146B. FIG. 7 illustrates path candidates generated in a case of the own vehicle M changing lanes from lane L1 to lane L2.

Figure 8:
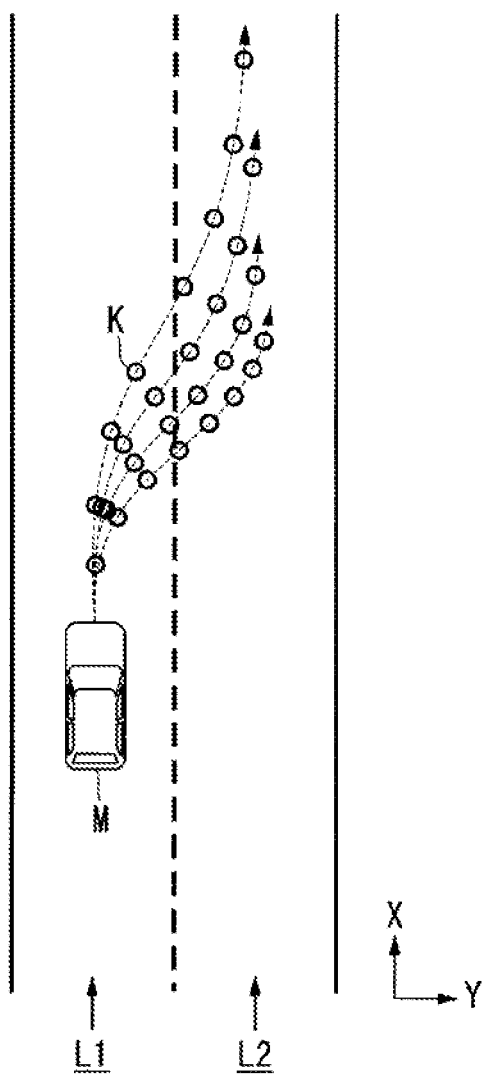
FIG. 8 is a diagram expressing candidates of paths generated by the path candidate generating unit as path points.

The path candidate generating unit 146B decides paths such as illustrated in FIG. 7 as collections of target positions (path points K) that a reference position of the own vehicle M (e.g., center of gravity or center of rear axle) should reach at each predetermined time in the future, for example. FIG. 8 is a diagram expressing path candidates generated by the path candidate generating unit 146B as path points K. The broader the interval between path points K is, the faster the speed of the own vehicle M is, and the narrower the interval between path points K is, the slower the speed of the own vehicle M is. Accordingly, when acceleration is desirable, the path candidate generating unit 146B sets the path points K so that the intervals gradually increase, and when deceleration is desirable, sets the path points K so that the intervals gradually decrease. Thus, the path points K include a speed component, so the path candidate generating unit 146B needs to provide each of the path points K with a target speed. The target speed is decided in accordance with the traveling form decided by the traveling form deciding unit 146A.

Now, a technique for deciding a target speed when changing lanes (including branching) will be described. The path candidate generating unit 146B first sets a lane-changing target position (or merging target position). The lane-changing target position is set as a relative position as to vehicles in the periphery, and is a decision regarding "between which vehicles in the periphery to change lanes to". The path candidate generating unit 146B focuses on three vehicles in the periphery using a lane-changing target position as a reference, and decides a target speed for changing lanes.

Figure 9:
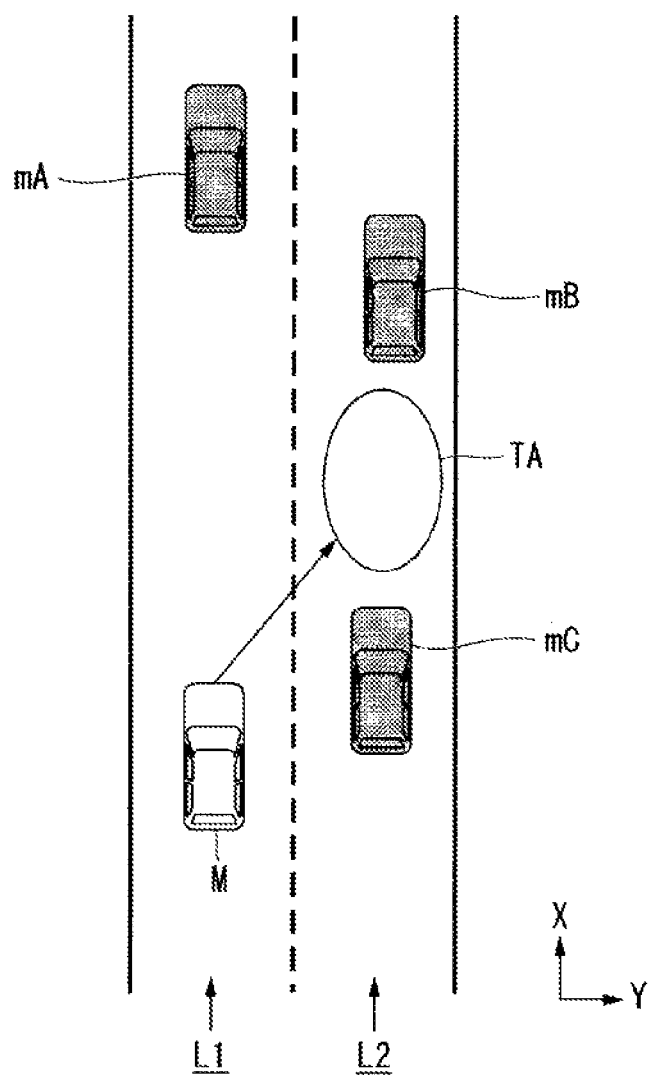
FIG. 9 is a diagram illustrating a lane-changing target position.

FIG. 9 is a diagram illustrating a lane-changing target position TA. In FIG. 9, L1 represents the own lane, and L2 represents an adjacent lane. Now, a vehicle in the periphery that is traveling immediately ahead of the own vehicle M in the same lane as the own vehicle M will be defined as a fore-traveling vehicle mA, a vehicle in the periphery that is traveling immediately ahead, of the lane-changing target position TA as a fore-reference vehicle mB, and a vehicle in the periphery that is traveling immediately behind the lane-changing target position TA as an aft-reference vehicle mC. The own vehicle M must accelerate or decelerate to move to the side of the lane-changing target position TA, but must avoid catching up with the fore-traveling vehicle mA in doing so. Accordingly, the path candidate generating unit 146B predicts the future state of the three vehicles in the periphery, and decides the target speed so as to not interfere with any of these vehicles in the periphery.

Figures 10, 11:
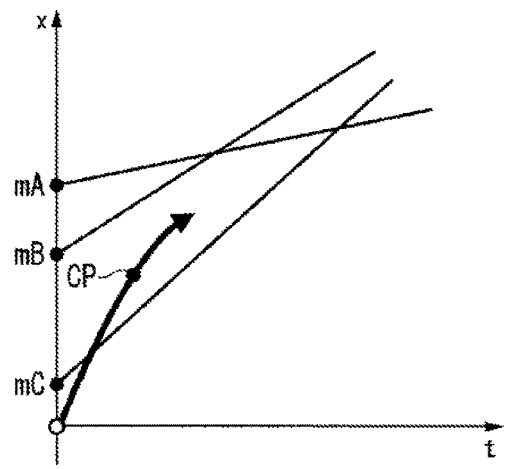
FIG. 10 is a diagram illustrating a speed generating model in a case where the speed of three vehicles in the periphery is assumed to be constant.
FIG. 11 is a diagram illustrating an example of mode-based operability/inoperability information.

FIG. 10 is a diagram illustrating a speed generation model, assuming that the speed of the three vehicles in the periphery is constant. The lines extending straight from points mA, mB, and mC in FIG. 10 represent change in position of each of the vehicles in the periphery in the direction of travel, assuming that all vehicles in the periphery are traveling at a constant speed. At a point CP where lane changing is complete, the own vehicle M must be between the fore-reference vehicle mB and the aft-reference vehicle mC, and further must be behind the fore-traveling vehicle mA before that. Under such constraints, the path candidate generating unit 146B derives multiple time-sequence patterns of the target speed until changing of lanes is completed. The time-sequence patterns for the target speed are applied to a model such as a spline curve or the like, thereby deriving multiple path candidates such as illustrated in FIG. 7 described above. Note that the movement patterns of the three vehicles in the periphery is not restricted to prediction assuming constant speed illustrated in FIG. 10, and may be predicted assuming constant acceleration or constant jerk.

The evaluation/selection unit 146C performs evaluation of the path candidates generated by the path candidate generating unit 146B, from the perspective of two points, which planning and safety, for example, and selects a path to output to the traveling control unit 160. From the perspective of planning, for example, a path that is truer to the already-generated plan (e.g., the action plane), and has a short path length, will be highly evaluated. For example, in a case of changing lanes to the right, a path where the vehicle must first change lanes to the left and then come back will be evaluated low. From the perspective of safety, the greater the distance between the own vehicle M and other objects (vehicles in the periphery, etc.) is at each path point, and the smaller the amount of change in acceleration/deceleration and steering angle is, for example, the higher the evaluation will be.

The switching control unit 150 switches between automated drive mode and manual driving mode, based on signals input from the automated drive switchover switch 87A. The switching control unit 150 also switches from automated drive mode to manual driving mode, based on operations on the configuration of the driving operation system of the HMI 70 instructing acceleration, deceleration, or steering. For example, in a case where a state in which the operation amount of a signal input from the configuration of the driving operation system of the HMI 70 exceeds a threshold value for a reference amount of time or longer, the switching control unit 150 switches from automated drive mode to manual driving mode (overriding). The switching control unit 150 may also restore the automated drive mode if there is no detection of operations of the configuration of the driving operation system of the HMI 70 for a predetermined amount of time after having switched to the manual driving mode due to an override.

The traveling control unit 160 controls the traveling drive force output device 200, the steering device 210, and the brake device 220, so that the own vehicle M passes the traveling path (path information), generated (scheduled) by the path generating unit 146, on time. The traveling control unit 160 also controls acceleration/deceleration of the own vehicle M in accordance with the traveling path.

Upon being notified of information of the automated drive mode by the automated drive control unit 120, the HMI control unit 170 references the mode-based operability/inoperability information 188, and controls the HMI 70 according to the type of automated drive mode. FIG. 11 is a diagram illustrating an example of the mode-based operability/inoperability information 188. The mode-based operability/inoperability information 138 illustrated in FIG. 11 has "manual driving mode" and "automated drive mode" as driving mode items. The mode-based operability/inoperability information 188 also has the above-described "mode A", "mode B", and "mode C", and so forth, as "automated drive mode". The mode-based operability/inoperability information 188 further has "navigation operations" which are operations regarding the navigation device 50, "content playing operations" which are operations regarding the content playback device 85, "instrument panel operations" that are operations regarding the display device 82, and so forth, as non-driving operation system items. Although the example of the mode-based operability/inoperability information 188 illustrated in FIG. 11 is set regarding whether or not the vehicle passenger can operate the non-driving operation system according to each driving mode, the relevant interface device (display unit, etc.) is not restricted to this.

The HMI control unit 170 determines which devices are permitted to be used and which devices are net permitted to be used, by referencing the mode-based operability/inoperability information 188 based on mode information acquired from the automated drive control unit 120. Based on the determination results, the HMI control unit 170 controls whether or not operations by the vehicle passenger can be accepted regarding the non-driving operation system of the HMI 70 or the navigation device 50.

For example, in a case where the driving mode that the vehicle control system 100 is carrying out is the manual driving mode, the vehicle passenger operates the driving operation system (e.g., the accelerator pedal 71, brake pedal 74, shift lever 76, steering wheel 78, and so forth) of the HMI 70. Also, in a case where the driving mode that the vehicle control system 100 is carrying out is mode B, mode C, etc., in the automated drive mode, the vehicle passenger is responsible for monitoring the periphery of the own vehicle M. In this case, the HMI control unit 170 effects control so that part or all of the non-driving operation system of the HMI 70 does not accept operations, in order to prevent the vehicle passenger from being distracted (driver distraction) by actions other than driving (e.g., operating the HMI 70, etc.). In doing so, the HMI control unit 170 may display images or the like on the display device 82 the presence of vehicles in the periphery of the own vehicle M and the state of the vehicles in the periphery, recognized by the periphery recognizing unit 142, and accept confirmation operations at the HMI 70, in accordance with the current situation while the own vehicle M is traveling, in order to keep the vehicle passenger monitoring the periphery.

In a case where the driving mode is mode A in automated driving, the HMI control unit 170 relaxes restrictions on driver distraction, and effects control to accept operations by the vehicle passenger to the non-driving operation system, which had not been accepted before. For example, the HMI control unit 170 displays video on the display device 82, outputs sound from the speaker 83, plays content from DVDs or the like at the content playback device 35, and so forth. The content played by the content playback device 85 may include, besides contents stored on DVDs or the like, various types of contents relating to amusement or entertainment, such as TV programs and so forth. The "content playing operations" illustrated in FIG. 11 may mean to operate content relating to amusement or entertainment.

Screen Example

Screen examples displayed on the screen of the navigation device 50 as an example of information presented from the navigation device 50 to the vehicle passenger, according to the present embodiment, will now be described with reference to drawings. Note that the screen examples described below are not restrictive regarding the positions and sizes of display, the contents of display, and so forth.

Figure 12:
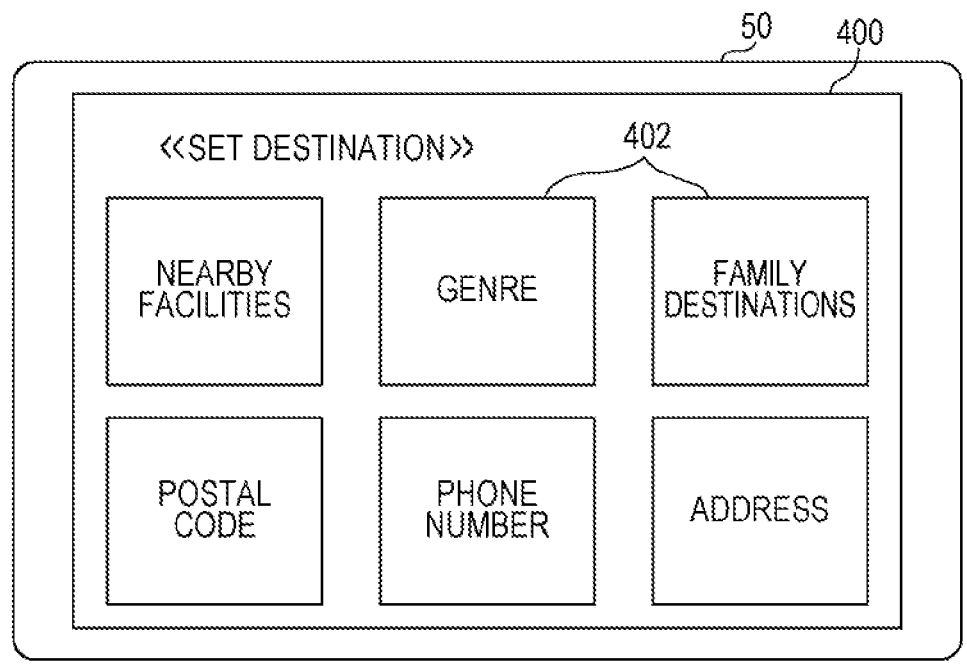
FIG. 12 is a diagram illustrating an example of a destination setting screen.

FIG. 12 is a diagram illustrating an example of a destination setting screen. Upon having accepted an instruction to set a destination from the vehicle passenger, the navigation device 50 displays a menu screen (an example of an interface screen) 400 for setting the destination, as illustrated in FIG. 12. The menu screen 400 has buttons (GUI icons, etc.) 402 to select a category from, such as "nearby facilities", "genre", "family destinations", "postal code", "phone number", "address", and so forth.

For example, in a case of accepting selection of the "nearby facilities" button, the navigation device 50 transitions to a screen to display nearby facilities (e.g., parking lots, gas stations, etc.) corresponding to the current location of the own vehicle M. In a case of accepting selection of the "genre" button, the navigation device 50 transitions to a screen to set a destination under conditions such as "restaurants", "parks", "movie theaters", and so forth. Also, in a case of accepting selection of the "family destinations" button, the navigation device 50 transitions to a screen to select a destination from a list such as "amusement parks", "zoos", "aquariums", and so forth. In a case of accepting selection of the "postal code" button, the navigation device 50 transitions to a screen where the destination can be set by inputting a postal code. In a case of accepting selection of the "phone number" button, the navigation device 50 transitions to a screen where the destination can be set by inputting a phone number. In a case of accepting selection of the "address" button, the navigation device 50 transitions to a screen where the destination can be set by inputting an address.

Figure 13:
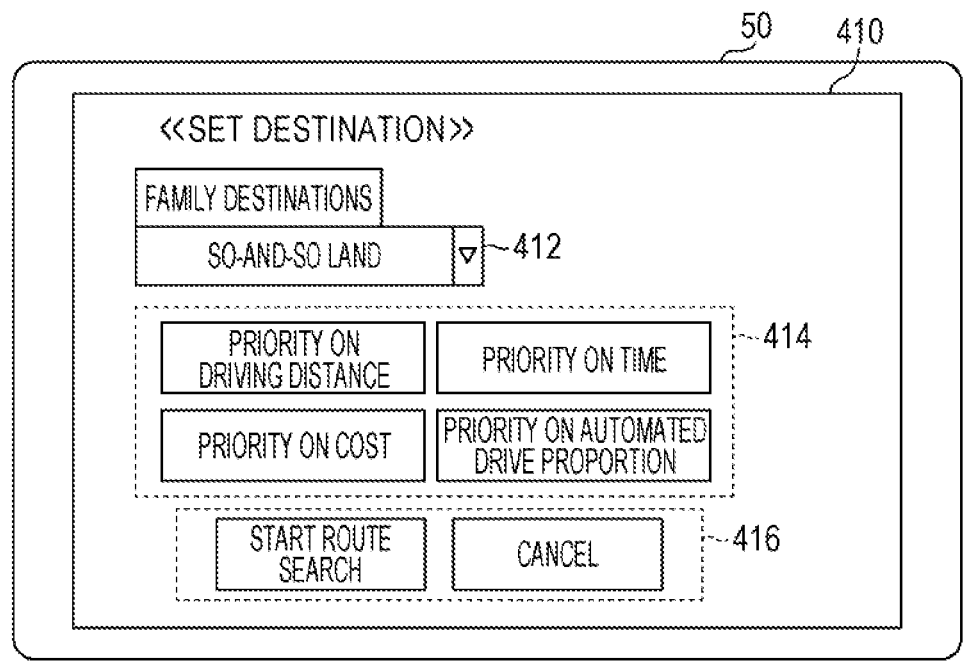
FIG. 13 is a diagram illustrating an example of a route search start screen.

FIG. 13 is a diagram illustrating an example of a route search start screen. The route search start screen (example of an interface screen) 410 illustrated in the example in FIG. 13 includes an input region 412, a search conditions setting region 414, and a route search execution selection region 416. The "family destinations" button has been selected by the vehicle passenger in the menu screen 400 illustrated in FIG. 12, for example, in the example illustrated in FIG. 13, with "So-And-So Land" having been selected from a preset list of multiple family destinations, and displayed in the input region 412 of the route search start screen 410.

Buttons such as "priority on driving distance", "priority on time", "priority on cost", "priority on automated drive proportion", and so forth, for example, are provided in the search conditions setting region 414, and at least one of these conditions is selected to set the search conditions. For example, in a case where the "priority on driving distance" button has been selected, the route to the destination is searched in order of shortest driving distance. In a case where the "priority on time" has been selected, the route to the destination is searched in order of shortest predicted driving time. In a case where "priority on cost" has been selected, the route to the destination is searched in order of least cost in passage fess, such as toll roads encountered on the traveling route. In a case where the "priority on automated drive proportion" button has been selected, the route to the destination is searched in order of high automated drive proportion on the traveling route.

The route search execution selection region 416 has, for example, "start route search", "cancel", and so forth set. When selection of the "start route search" button is accepted, the navigation device 50 searches a route based on the set destination and search conditions. In a case where selection of the "cancel" button has been accepted, the navigation device 50 cancels the search for a route to the destination, and transitions to the menu screen 400 or the like.

Figure 14:
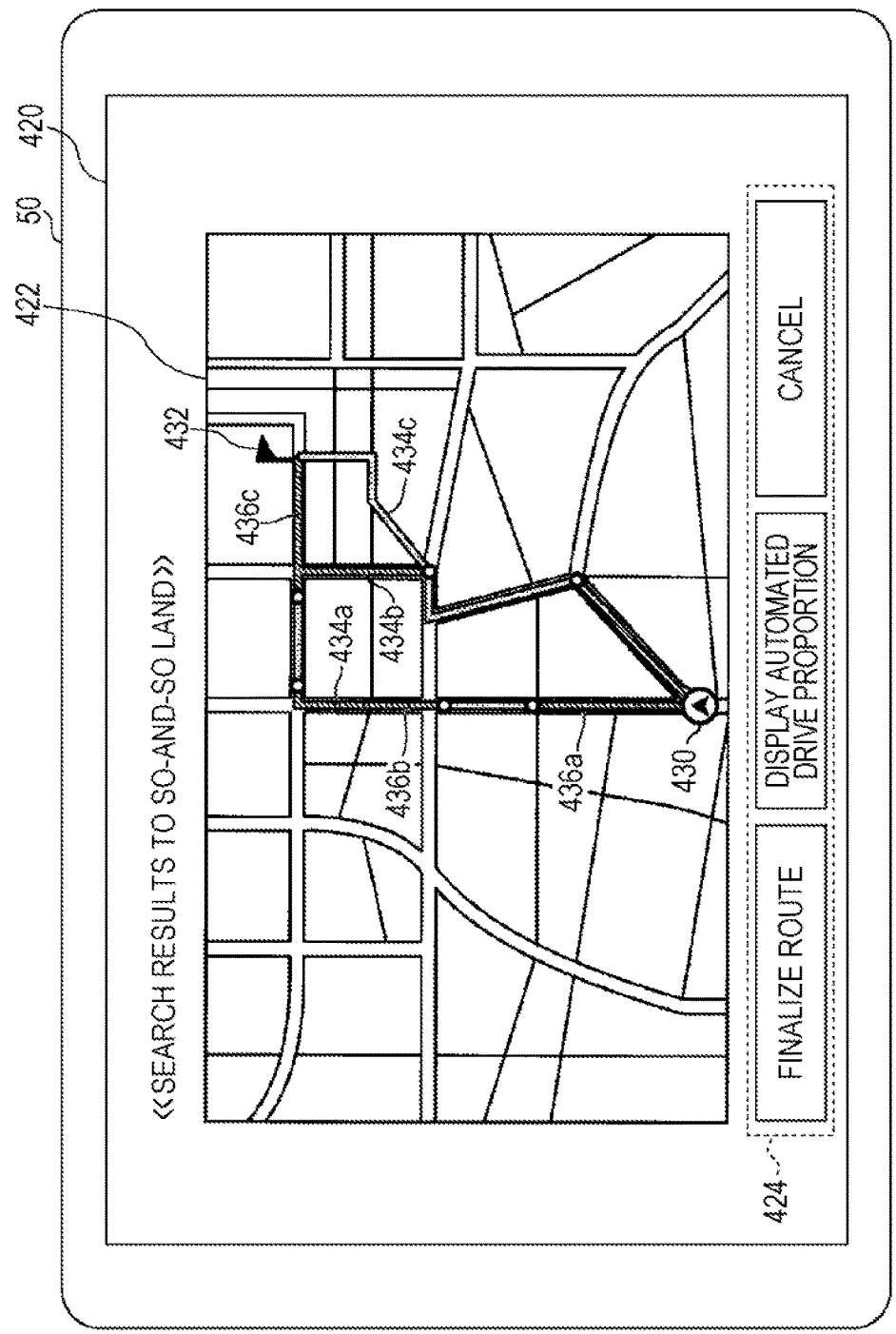
FIG. 14 is a diagram illustrating an example of a route search results display screen.

FIG. 14 is a diagram illustrating an example of a route search results display screen. The route search results display screen (example of interface screen) 420 illustrated in FIG. 14 has a route candidate display region 422 and a route navigation execution selection region 424. The route candidate display region 422 has displayed therein map information, an object 430 indicating the position of the own vehicle M, an object 432 indicating the location of the destination that has been set, and objects 434 indicating traveling route candidates. Note that the display forms of the objects 430 through 434 are not restricted to those illustrated in the example in FIG. 14. As one example, FIG. 14 illustrates objects 434a through 434c indicating three traveling routes candidates (e.g., route A through route C) found from the route search.

The navigation device 50 may display the objects 430 through 434 in the route candidate display region 422 superimposed on map information as illustrated in FIG. 14, or may generate an image integrated with map information and display this in the route candidate display region 422. The navigation device 50 may also display the objects 434a through 434c of the traveling route candidates at the same time, or may display the objects 434a through 434c of the candidates being switched in a predetermined order every predetermined amount of time.

The navigation device 50 either displays superimposed or integrated, on/with the image displayed on the route search results display screen 420, objects 436 indicating automated drive sections where the own vehicle M can travel in automated drive mode, for each of the objects 434a through 434c of the traveling route candidates. For example, the traveling route object 434a in FIG. 14 has three automated drive section objects 436a through 436c decided by the above-described target lane deciding unit 110, displayed by objects using colors, designs, symbols, or the like, so as to be distinguishable from the traveling route object 434a and other images (objects, etc.).

The route search results display screen 420 illustrated in FIG. 14 may also be a selection screen for selecting a traveling route. In this case, the vehicle passenger of the own vehicle M touches the object of one traveling route out of the objects 434a through 434c of the traveling route candidates displayed on the route search results display screen 420 of the navigation device 50. Accordingly, selection operations of the traveling route are accepted, and that traveling route is selected.

The route navigation execution selection region 424 is provided with buttons such as "finalize route", "display automated drive proportion", "cancel", and so forth. In a case where selection of the "finalize route" button has been accepted, the navigation device 50 starts route navigation and automated driving of the traveling route and automated drive sections selected at the current point. In a case where selection of the "display automated drive proportion" button has been accepted, the navigation device 50 transitions to an automated drive proportion display screen. In a case where multiple traveling route candidates exist from the search results, the automated drive proportion is displayed for each traveling route candidate in the present embodiment. In a case where selection of the "cancel" button has been accepted, the navigation device 50 cancels the route search, and transitions to the menu screen 400.

Figure 15:
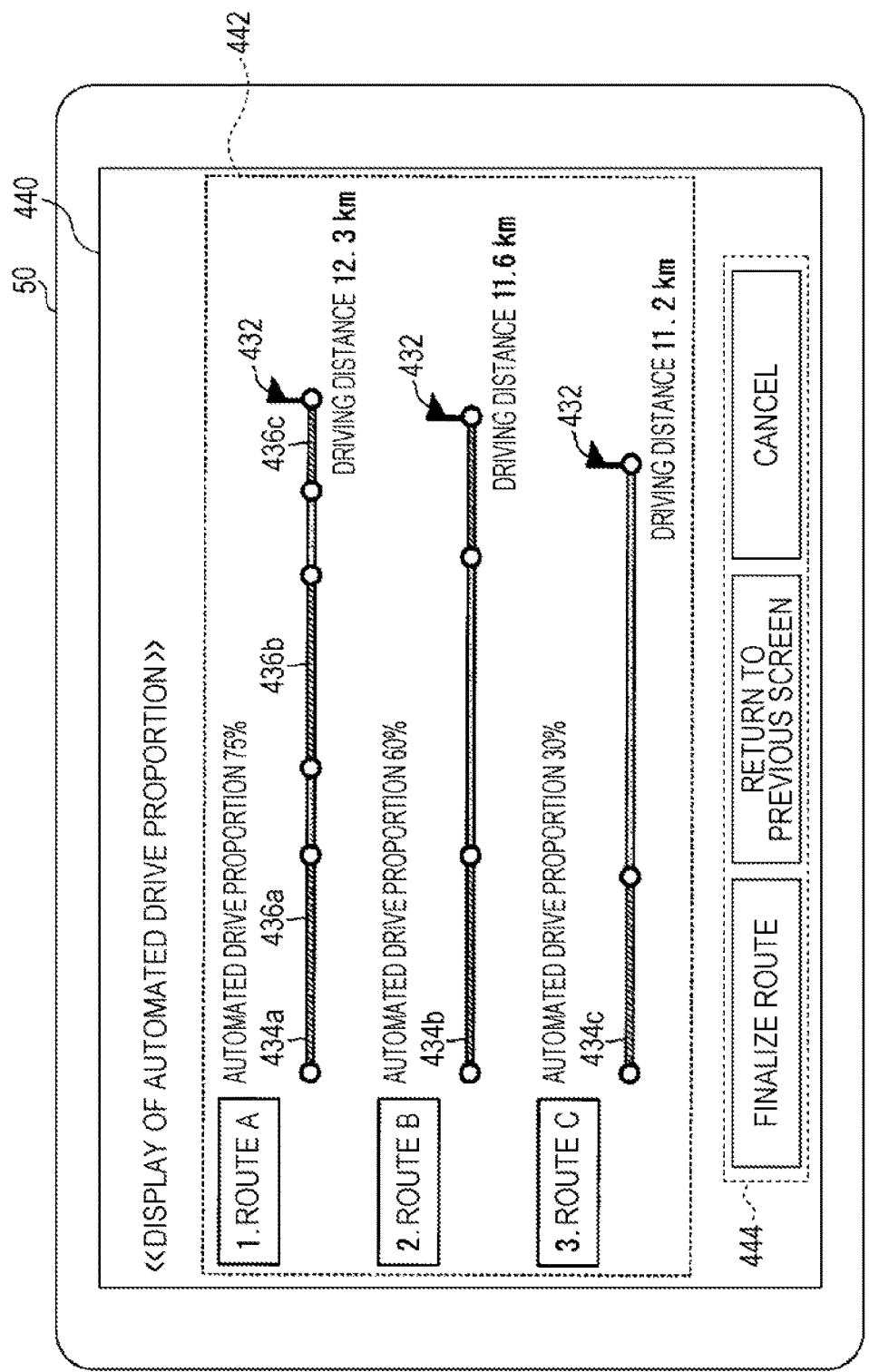
FIG. 15 is a diagram illustrating an example of an automated drive proportion display screen.

FIG. 15 is a diagram illustrating an example of an automated drive proportion display screen. The automated drive proportion display screen 440 illustrated in FIG. 15 has an automated drive proportion display region 442 and a route navigation execution selection region 444.

The automated drive proportion display region 442 displays automated drive proportion, driving distance, and the above-described traveling route candidate objects 434a through 434c, for each of the three traveling route (e.g., route A through route C) obtained by the route search. Note that an object 436 indicating automated drive sections is also included on the objects 434a through 434c in each traveling route candidate. The automated drive proportion can be calculated by dividing the distance of the traveling route to the destination by the distance over which automated driving can be performed on the traveling route, or by dividing the predicted driving time to the destination by the predicted driving time by automated driving on the traveling route. Calculation of the automated drive proportion may be performed by the target lane deciding unit 110 or by the navigation device 50.

The automated drive proportion display region 442 may display the driving time when the above-described automated driving is performed, may display the driving time when manual driving is performed, or may display the number of times of switching between automated driving and manual driving (e.g., number of times of performing automated driving, number of times of handover control).

The navigation device 50 displays the traveling route candidate objects 434a through 434c from the current location of the own vehicle M to the destination (object 432) on the automated drive proportion display region 442 illustrated in FIG. 15 as straight lines. The traveling route candidate objects 434a through 434c are displayed having lengths corresponding to the driving distance. Accordingly, the driving schedule of the own vehicle M and the timings for automated driving, the number of times of automated driving, and so forth, can be notified to the vehicle passenger in a way that is readily comprehendible.

The automated drive proportion display screen 440 illustrated in FIG. 15 may also be a selection screen for selecting a traveling route. In this case, the vehicle passenger of the own vehicle M touches a portion where there is displayed an object of one of the traveling routes, out of the traveling route candidate objects 434a through 434c displayed on the automated drive proportion display screen 440 of the navigation device 50. Accordingly, the selection operation for that traveling route is accepted, and that traveling route is selected. The navigation device 50 may alternatively accept selection of one of route A through route C, thereby selecting that traveling route.

The route navigation execution selection region 444 is provided with buttons such as "finalize route", "return to previous screen", "cancel", and so forth. In a case of having accepted selection of the "finalize route" button, the navigation device 50 starts route navigation and automated driving of the traveling route and automated drive section selected at the current point. In a case of having accepted selection of the "return to previous screen" button, the navigation device 50 transitions to the route search results display screen 420 illustrated in FIG. 14. In a case of having accepted selection of the "cancel" button, the navigation device 50 cancels the route search, and transitions to the menu screen 400.

Figure 16:
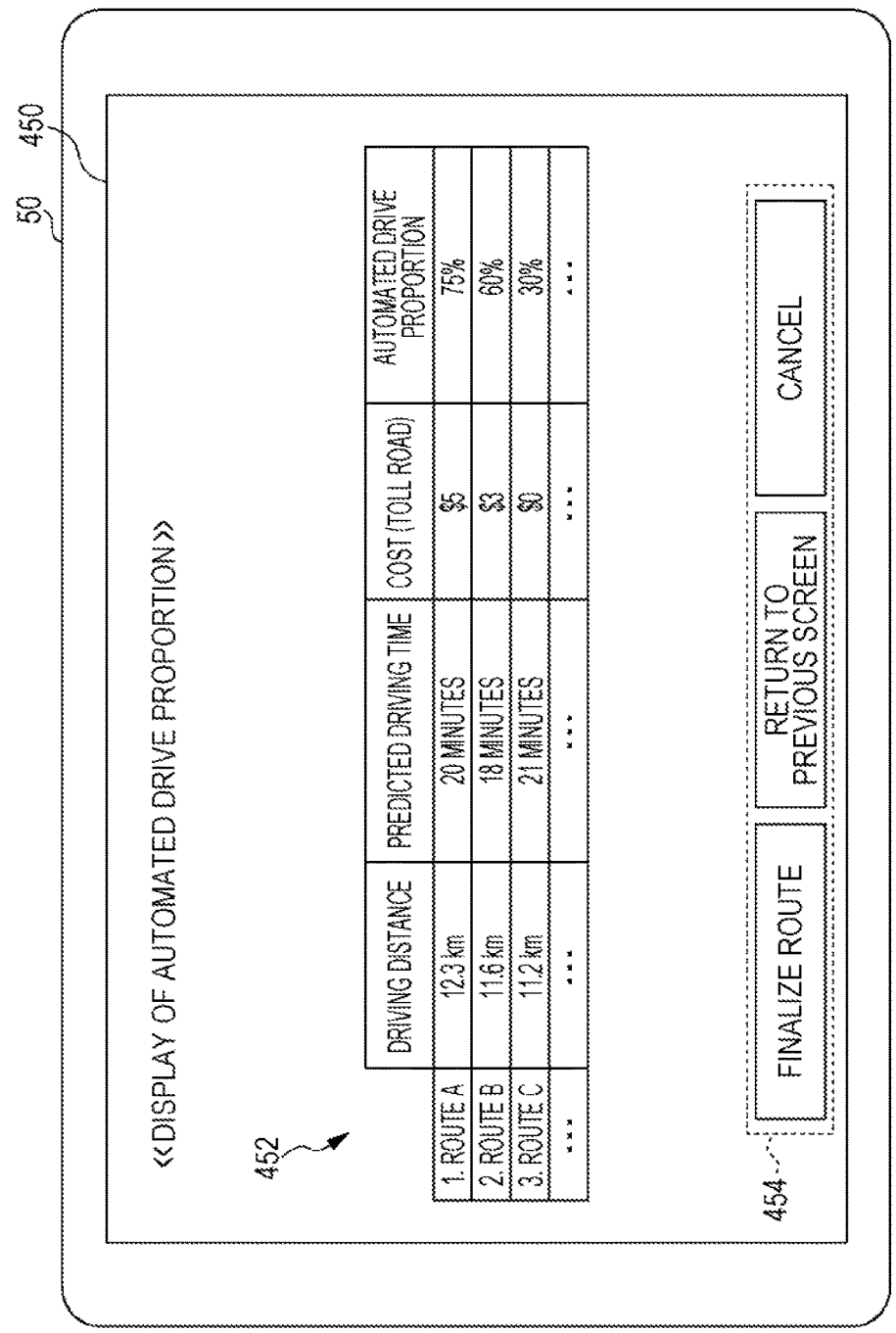
FIG. 16 is a diagram illustrating an example of an automated drive proportion display screen.

An example of the automated drive proportion display screen of the present embodiment is not restricted to the example illustrated in FIG. 15, and the automated drive proportion may be displayed in a list format, for example, or the like. FIG. 16 is a diagram illustrating another example of an automated drive proportion display screen. The automated drive proportion display screen 450 illustrated in FIG. 16 is provided with an automated drive proportion list 452 and a route navigation execution selection region 454. Note that the route navigation execution selection region 454 has the same buttons as the above-described route navigation execution selection region 444 and the processing contents by selection of the buttons is the same as the contents described above, so detailed description will be omitted here.

Displayed in the automated drive proportion list 452 are the driving distance to the destination, predicted driving time, cost (toll roads), and automated drive proportion, for example, for each of the three traveling routes obtained by route searching (e.g., route A through route C). Although the cost here is costs such as toll fees on the traveling route to the destination, for example, this is not restrictive, and this may be costs estimated from gas mileage of the own vehicle M. Further, the automated drive proportion list 452 may display the driving distance, predicted driving time, etc., in automated drive mode and manual driving for example, and may also display the number of times of switching between automated driving and manual driving (e.g., handover control count).

The automated drive proportion display screen 450 illustrated in FIG. 16 may also be a selection screen for selecting a traveling route. In this case, the vehicle passenger of the own vehicle M touches one region of regions where the text "route A" through "route C" in the automated drive proportion list 452, displayed on the automated drive display screen 450, is displayed. Accordingly, selection operations of the traveling route corresponding to the displayed route are accepted, and that traveling route is selected.

Note that a screen may be displayed where part or all of the screens in the above-described examples in FIGS. 12 through 16 are combined. For example, the automated drive proportion display screens 440 and 450 in FIGS. 15 and 16 may be displayed in a single screen, and may be displayed on the route search results display screen 420 illustrated in FIG. 14. That is to say, the automated drive proportion corresponding to each candidate traveling route may be displayed in the route candidate display region 422 illustrated in FIG. 14. Further, information and the like relating to the overall required time and economics to the destination may be displayed for each travelling route displayed in the screens illustrated in FIGS. 14 through 16 described above, for example.

Although description has been made in the examples in FIGS. 12 through 16 of screen examples displayed on the navigation device 50, the vehicle control system 100 may have, as one or more display units, one or both of the display unit of the HMI 70 installed in the own vehicle M (the navigation device 50, display device 82, etc.) and the terminal device that the vehicle passenger of the own vehicle M has, and part or all of the above-described screen examples may be displayed on multiple display units, for example.

In this case, an arrangement may be made where, of the route search results display screen 420 illustrated in FIG. 14 for example, the route candidate display region 422 is displayed on the navigation device 50 and the route navigation execution selection region 424 is displayed on the terminal device. Each display unit is capable of exchanging data under control of the HMI control unit 170. Accordingly, information selected by the terminal device is reflected in the route candidate display region 422 displayed on the navigation device 50. The HMI control unit 170 can also display content displayed on the navigation device 50, on the display device 82 at the same time, for example. Which content to be displayed on which display unit may be preset, or may be optionally set by the vehicle passenger or the like.

The HMI control unit 170 may also output audio of various types of information (automated drive proportion, etc.) relating to automated driving such as described above in FIGS. 15 and 16, for example from the speaker 83 of the HMI 70, so as to present to the vehicle passenger of the own vehicle M. Accordingly, even if the vehicle passenger is not watching the display unit of the HMI 70, the vehicle passenger can be made to comprehend information relating to automated driving. The HMI control unit 170 may also combine the above-described screen display and audio output to present to the vehicle passenger.

Processing Flow

Figure 17:
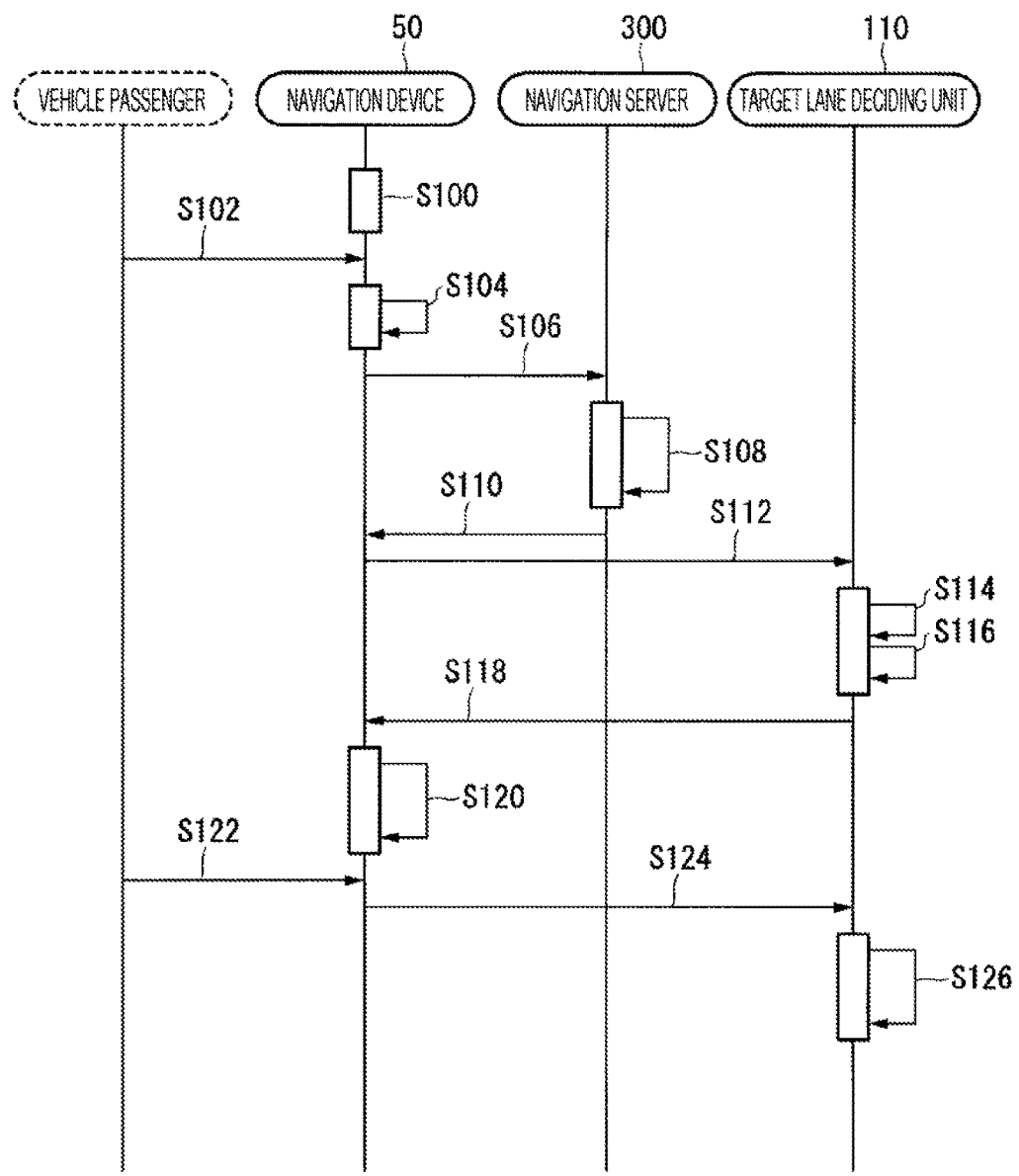
FIG. 17 is a sequence diagram illustrating an example of route setting processing.

The following is a description of route setting processing according to the present embodiment. FIG. 17 is a sequence diagram illustrating an example of route setting processing. The sequence diagram in FIG. 17 shows the navigation device 50, navigation server 300, and target lane deciding unit 110, for convenience of description.

In an example illustrated in FIG. 17, the navigation device 50 displays a menu screen or the like, for setting the destination, to the vehicle passenger of the own vehicle M (step S100). Next, the navigation device 50 accepts setting information for the destination from the vehicle passenger (step S102), acquires the current location of the own vehicle M (step S104), and transmits the acquired current location and information relating to the destination (query signal) to the navigation server 300 via the communication device 55 (step S106).

The navigation server 300 generates information relating to at least one traveling route from the current location and destination information transmitted thereto (step S108), and transmits the information relating to the generated traveling route to the own vehicle M. Information relating to the traveling route is information such as, for example, which points to pass, driving distance to the destination, driving time, and so forth, but is not restricted to these. Information relating to the traveling route may also include, for example, map information, traffic information, weather information, and so forth.

The navigation device 50 acquires information relating to the traveling route that has been transmitted from the navigation server 300 (step S110), and outputs the acquired information relating to the traveling route to the target lane deciding unit 110 (step S112). The target lane deciding unit 110 generates sections to perform automated driving based on information relating to the traveling route, and the high-precision map information 182 (step S114). The target lane deciding unit 110 also calculates the automated drive proportion on the traveling route, based on driving distance corresponding to the traveling route to the destination, and the driving distance for performing automated driving that have been generated (total of the driving distance of each section (step S116). Note that in the processing in step S116, the automated drive proportion is calculated using the driving distance as a reference, but the automated drive proportion on the traveling route may be calculated in the processing in step S116 based on the predicted driving time on the traveling route and the predicted driving time of the sections for performing automated driving (the total of predicted driving time of each section), for example.

The target lane deciding unit 110 outputs the automated drive sections calculated regarding each traveling route candidate, information relating to the automated drive proportion, and so forth, to the navigation device 50 (step S118). The navigation device 50 displays information relating to the traveling route, information regarding automated drive sections, and information relating to automated drive proportion, on the screen (step S120). The information illustrated in FIGS. 14 and 15 described above, for example, is displayed on a screen in the processing in step S120. Also, at least one of the information relating to the traveling route, information regarding automated drive sections, and information relating to automated drive proportion, may be output by audio in the processing in step S120.

Next, the navigation device 50 accepts information relating to the finalized traveling route by selection by the vehicle passenger of the own vehicle M (step S122), and outputs the accepted information to the target lane deciding unit 110 (step S124). The target lane deciding unit 110 performs decision of the target lane and so forth for automated driving and so forth, based on the finalized traveling route and automated drive sections, and performs vehicle control in collaboration with the automated drive control unit 120, traveling control unit 160, and HMI control unit 170 and so forth (step S126).

At least one of the above-described automated drive proportion, distance of performing automated driving, predicted driving time of automated driving, timing of performing automated driving, and the number of times of performing automated driving, may be displayed on the screen in the route setting processing in FIG. 17 described above. Note that the above-described route setting processing illustrated in FIG. 17 is executed before the navigation device 50 starts route navigation, but even while performing navigation of the own vehicle M along the decided traveling route, the navigation device 50 may reset at least one of the traveling route candidates from the current location to the destination of the own vehicle M, the automated drive proportion for each traveling route candidate, distance over which automated driving can be performed, predicted driving time over which automated driving can be performed, timing for performing the automated driving, and number of times of performing the automated driving, based on change in the state of the traveling route that has been decided, and display the reset information on the screen. The above change in the state of the traveling route includes cases where sudden thunderstorms, snow, or the like has been detected from weather information (metrological information), cases where traffic accidents or the like on the planned route have been detected from traffic information, and so forth. The newest information (weather or traffic accident-information) or the like for the above-described weather information or traffic information can be periodically obtained from the navigation server 300 or the like, for example.

Figure 18:
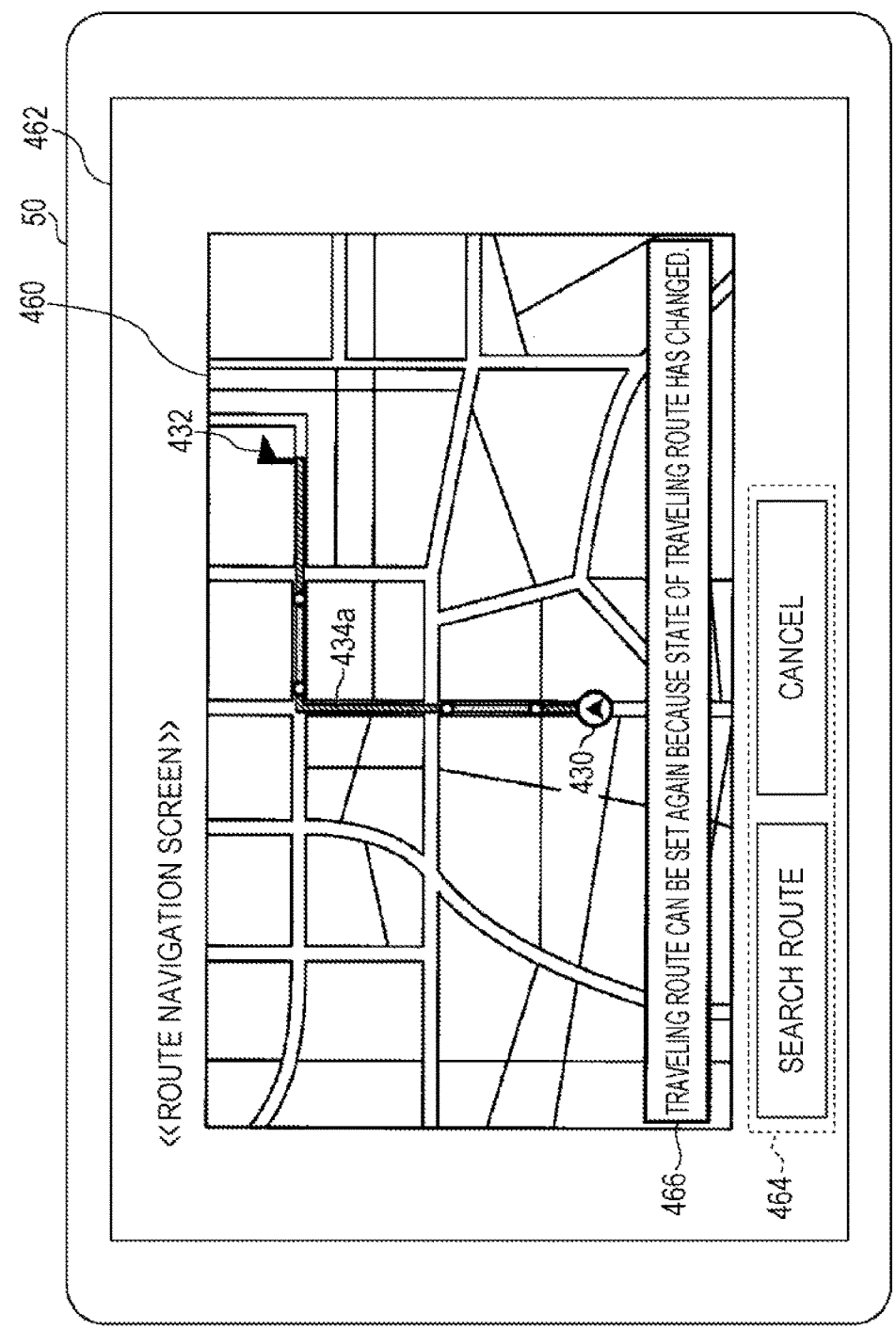
FIG. 18 is a diagram illustrating an example of a screen when performing route navigation.

FIG. 18 is a diagram illustrating an example of a screen when performing route navigation. A route navigation screen (example of an interface screen) 460 illustrated in FIG. 18 includes a route navigation display region 462 and a route search-again selection region 464.

The route navigation, display region 462 displays map information, the object 430 indicating the location of the own vehicle M, the object 432 indicating the location of the destination that has been set, and the object 434 indicating the traveling route being navigated. FIG. 18 shows object 434*a* indicating the traveling route for route A, out of the three traveling routes described above (e.g., route A through route C), as one example.

The navigation device 50 periodically acquires information of the current location of the own vehicle M as it travels, and displays the location of the own vehicle M in correlation with the location information of the map in the route navigation display region 462, based on the acquired location information. The navigation device 50 continues to acquire weather information and traffic information from the navigation server 300 even while navigating the route, and determines whether or not the state of the traveling route has changed from when the route was set, based on the acquired information. In a case where determination is made that the state of the traveling route has changed, the navigation device 50 displays message information 466 in the route navigation display region 462 to the effect that the traveling route can be set again. One example of the message information 466 is to display information, such as "TRAVELING ROUTE CAN BE SET AGAIN BECAUSE STATE OF TRAVELING ROUTE HAS CHANGED", or the like, as shown in FIG. 18 for example, but this is not restrictive.

The navigation device 50 displays, along with the display of the message information 466, a "search route" button and "cancel" button in the route search-again selection region 464. In a case where selection of the "search route" button is accepted, the navigation device 50 acquires the route searching at the above-described navigation server 300 for example, and automated drive sections and automated drive proportion at the target lane deciding unit 110, and traveling route candidates are displayed as illustrated in FIG. 14. Accordingly, in a case where the automated drive proportion is changed in accordance with change in the state of the traveling route, the traveling route of the own vehicle M can be set again by the vehicle passenger. In a case where selection of the "cancel" button is accepted in the route search-again selection region 464, the navigation device 50 hides the message information 466 from view, and also hides the buttons in the route search-again selection region 464 from view. Note that in a case where selection of the "cancel" button has been accepted in the route search-again selection region 464, the navigation device 50 hides the message information 466 from view, and also hides the buttons in the route search-again selection region 464 from view. Accordingly, in a case where automated driving is no longer viable due deteriorating road conditions, poor visibility, traffic congestion or the like, based on change in the state of the traveling route in an automated drive section set beforehand, for example, an appropriate automated drive proportion can be recalculated and displayed, so the vehicle passenger can accurately select a desired route.

According to the embodiment described above, the vehicle passenger is presented with information relating to automated driving on a traveling route to a destination, so a route closer to the intent of the passenger can be easily selected from multiple routes including automated drive sections.

Although a form to carry out the present disclosure has been described by way of an embodiment, the present disclosure is not restricted by the embodiment whatsoever, and various modifications and substitutions may be made without departing from the spirit and scope of the present disclosure.

What is claimed is:

1. A vehicle control system comprising:
   an automated drive control unit configured to perform automated driving where at least one of speed control and steering control of a vehicle is performed automatically;
   a route guidance unit configured to decide a traveling route on which the vehicle will travel to a preset destination and to guide the vehicle to travel the decided traveling route;
   a presentation unit configured to present information to an occupant of the vehicle; and
   an acquisition unit that acquires a state of the traveling route,
   wherein, when the vehicle is guided to travel the decided traveling route, the route guidance unit resets information comprising: one or more traveling route candidates; and at least one of the automated drive proportion for each traveling route candidate, the distance of the one or more automated driving sections in each traveling route candidate, the predicted driving period of time to travel the one or more automated driving sections in each traveling route candidate, the timing of traveling the one or more automated driving sections in each traveling route candidate, and the number of times of traveling the one or more automated driving sections in each traveling route candidate, based on change in the acquired state of the traveling route.

2. The vehicle control system according to claim 1, wherein the route guidance unit calculates the automated drive proportion based on the distance of the decided traveling route to the destination and the distance of the one or more automated driving sections.

3. The vehicle control system according to claim 1, wherein the route guidance unit calculates the automated drive proportion based on a predicted driving period of time to travel the decided traveling route and the predicted driving period of time to travel the one or more automated driving sections.

4. The vehicle control system according to claim 1, further comprising:
   one or more display units that display images,
   wherein the route guidance unit displays the decided traveling route to the destination and the one or more automated driving sections thereof on the display units.

5. The vehicle control system according to claim 4, further comprising:
   an operation accepting unit configured to receive an operation by the occupant,
   wherein the route guidance unit displays on the display units one or more traveling route candidates to the destination, the automated drive proportion for each traveling route candidate, the distance of the one or more automated driving sections each traveling route candidate, the predicted driving period of time to travel the one or more automated driving sections in each traveling route candidate, the timing of traveling the one or more automated driving sections each in each traveling route candidate, and
   wherein the operation accepting unit allows the occupant to select one of the traveling route candidates displayed on the display units.

6. The vehicle control system according to claim 4, wherein, based on change in the state of the decided traveling route acquired by the acquisition unit, the route guidance unit displays the reset information on the display unit.

* * * * *